United States Patent [19]

Ziemacki et al.

[11] Patent Number: 5,401,949
[45] Date of Patent: Mar. 28, 1995

[54] FUZZY LOGIC BARCODE READER

[75] Inventors: Michael S. Ziemacki, De Bary; Paul M. Basehore, Sanford, both of Fla.

[73] Assignee: American NeuroLogix, Inc., Sanford, Fla.

[21] Appl. No.: 118,218

[22] Filed: Sep. 9, 1993

Related U.S. Application Data

[63] Continuation-in-part of Ser. No. 41,235, Mar. 31, 1993, which is a continuation-in-part of Ser. No. 893,093, Jun. 3, 1992, which is a continuation-in-part of Ser. No. 712,871, Jun. 12, 1991, Pat. No. 5,245,695.

[51] Int. Cl.$^6$ ............................................. G06K 7/10
[52] U.S. Cl. ................................... 235/463; 395/900
[58] Field of Search ..................... 235/463; 395/3, 900

[56] References Cited

U.S. PATENT DOCUMENTS

| | | | |
|---|---|---|---|
| 3,979,577 | 9/1976 | Seligman | 235/463 |
| 4,323,772 | 4/1982 | Serge | 235/463 |
| 4,757,206 | 7/1988 | Ohta | 235/463 |
| 4,973,830 | 11/1990 | Ouchi | 235/463 |

*Primary Examiner*—John Shepperd
*Attorney, Agent, or Firm*—Cushman, Darby & Cushman

[57] ABSTRACT

An arrangement (apparatus and method) using fuzzy logic for determining the ratios of barcode elements with respect to a reference barcode element. A barcode interface outputs width data for the reference barcode element and the other barcode elements of the barcode pattern in accordance with a predetermined barcode format. A latch array latches the width data of the reference barcode element and supplies the reference width data and a divided value of the reference width data to a fuzzy microcontroller as center and width data for a fuzzy membership function, respectively. The latch array also latches the barcode element width data from the barcode interface, divides the barcode element width data by a set of predetermined ratios, and outputs the quotient data to the fuzzy microcontroller. Each quotient data corresponding to one of the ratios is fuzzified by determining the distance of the crisp input from the center of the membership function and linearly complementing the distance with respect to the width of the membership function. The quotient data that has the highest membership value is deemed to correspond to the winning ratio. The fuzzy microcontroller uses rule-based logic that enables code recognition of the barcode scanner on the basis of successive determined ratios, as well as control of external devices in response to the determined ratios.

9 Claims, 20 Drawing Sheets

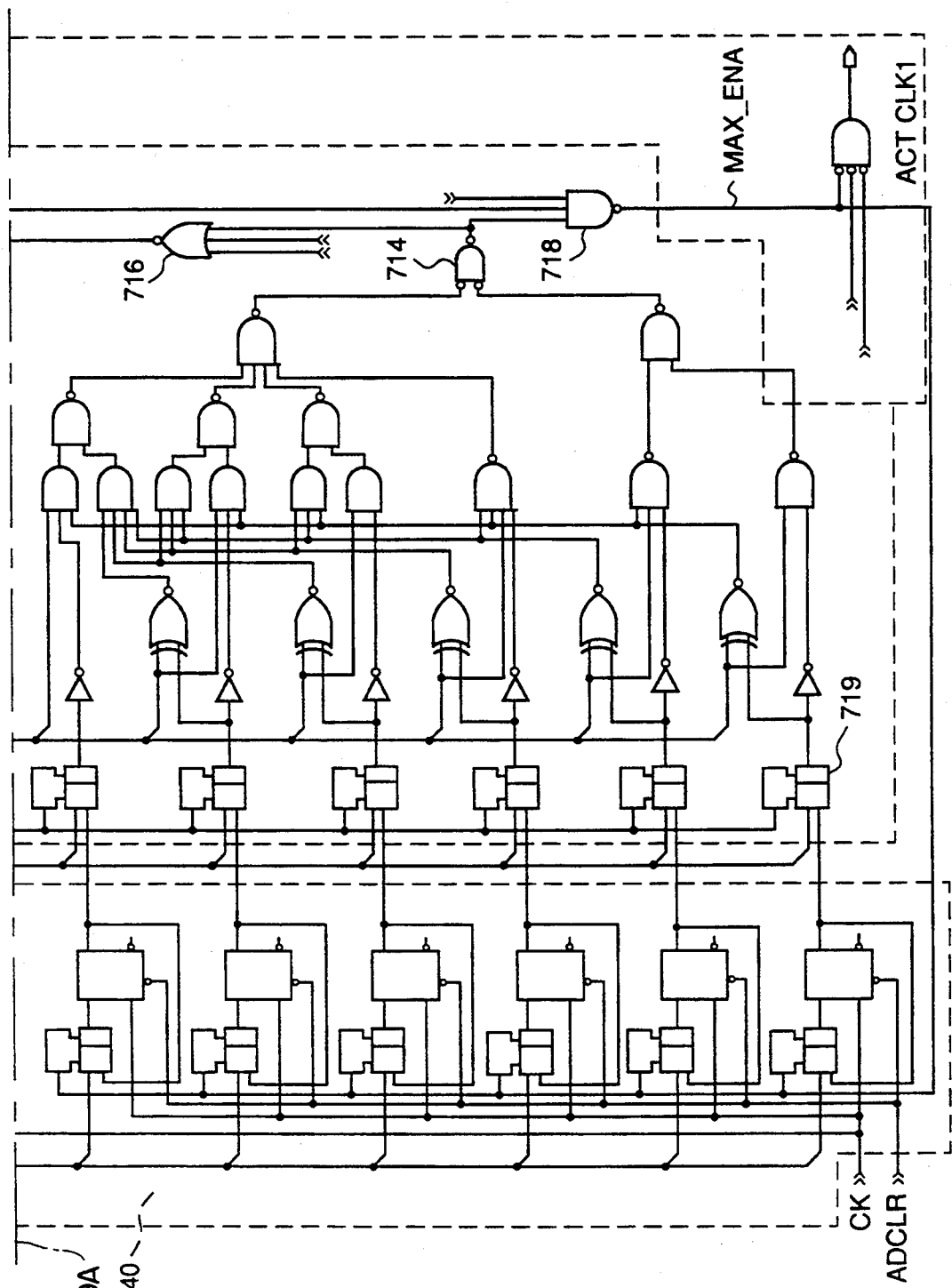
FIG. 9B JOINS FIG. 9A

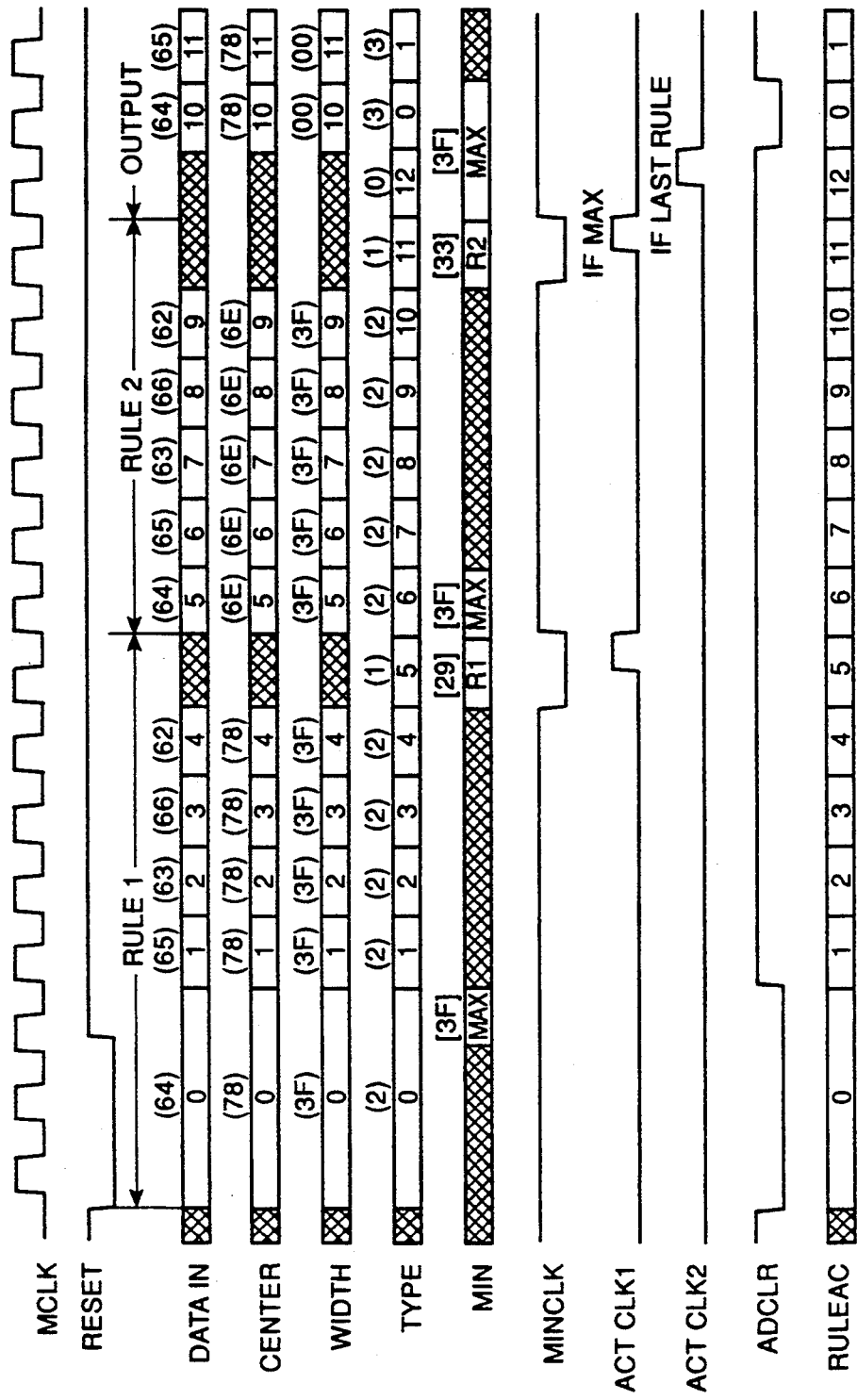

FUZZY LOGIC BARCODE READER

This application is a continuation-in-part of pending application 08/41,235, filed Mar. 31, 1993, which is a continuation-in-part of pending application 07/893,093, filed Jun. 3, 1992, which is a continuation-in-part of application 07/712,871, filed Jun. 12, 1991, which issued as U.S. Pat. No. 5,245,695.

BACKGROUND OF THE INVENTION

1. Field of the Invention

The present invention relates to rule-based expert control systems using fuzzy logic, as well as pattern and data recognition systems such as barcode readers.

2. Description of the Related Art

Control systems and computer-controlled electronic devices have historically been controlled by digital control systems. Such control systems use hi-state digital logic which requires a value of either "TRUE" or "FALSE", so that approximations are often required of real-world control problems. For example, an input-/output relationship $y=f(x)$ would be specified either as a mathematical function or as a series of points using, for example, a look-up table: the former use of a mathematical function may require complex mathematics to accurately represent real-world control problems; further, the latter use of a look-up table, such as a ROM, introduces problems such as large memory requirements for adequate approximation, the concomitant addressing function associated with large memories, as well as interpolation problems.

For example, FIG. 1A shows an exemplary nonlinear sigmoidal function $y=f(x)$. If digital logic was used to characterize the function $y=f(x)$, it would be necessary to approximate the function shown in FIG. 1A by using discrete values, $y_i=a_i \cdot x_i$ ($i=1, 2, \ldots, n$), as shown in FIG. 1B. Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic", was developed by L. Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

FIG. 1C illustrates the principle of fuzzy logic in evaluating the function illustrated in FIG. 1A. The function f(x) is approximated by a plurality of fuzzy sets 10 which overlap. Rather than approximating a continuous value x by a discrete value $x_i$, fuzzy logic determines for a given value x whether the value x is nearest to the center of a fuzzy set 10. If an x value is equidistant from two or more fuzzy sets, the resultant y value can be made proportional to the output values suggested by all the fuzzy sets of which the value x is a member. Thus, a fuzzy number may be two dimensional, having assigned fuzzy sets and corresponding membership values.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc.

An efficient implementation of fuzzy logic for a controller has been disclosed in U.S. Pat. No. 5,245,695 to Basehore. Specifically, Basehore discloses a fuzzification method for determining the similarity of the crisp input (e.g., the discrete demultiplexed signal undergoing fuzzification) to a fuzzy set. As shown in FIG. 2A, the degree of similarity between the crisp inputs $X_a$ and $X_b$ and the fuzzy set is defined by a membership function $\mu$. The fuzzification method shown in FIG. 2B disregards the shape of the membership function $\mu$ and instead determines the distance of the crisp input from a defined center of the membership function $\mu$; the distance of the crisp input is then linearly complemented with respect to the width of the membership function $\mu$ so that the resulting similarity signal is a maximum when the distance is a minimum, and, conversely, a minimum when the distance is a maximum (e.g., when the crisp input exceeds the width of the membership function $\mu$).

The co-pending application 08/41,235 recognized that it would be desirable to provide a simple implementation of fuzzy sets that has membership functions defined on the basis of varying parameters in order to provide a fully adaptive fuzzy logic system. Such an implementation would be effective in more advanced applications of fuzzy logic that require a fuzzy logic microcontroller capable of processing complex membership functions that have varying parameters. Specifically, the copending application 08/41,235 enabled the membership function parameter data to be directly supplied to the fuzzy input processor. As a result, a center could be defined as a predetermined value or a value supplied from an input source. The assignment of an input source to be a center value caused the corresponding membership function to have a variable, or "floating" center. Similarly, the membership function width data could be supplied from memory as predetermined data or from an input source as described above, thereby providing dynamic width fuzzifiers.

SUMMARY OF THE INVENTION

The inventors have recognized that the fuzzy logic microcontroller disclosed in co-pending application 08/41,235 is particularly useful in pattern or data recognition techniques. Specifically, the fuzzy logic microcontroller is useful in identifying data for barcode readers. Accordingly, it is an object of the present invention to provide an improved barcode reader that uses fuzzy logic for pattern and data recognition.

A barcode reader comprises a sensor, typically optic or magnetic, that detects the presence of elements such as bars or spaces in a pattern. The sensor outputs a signal representing the data pattern as a sequence of width data for the respective bars and spaces. The width of the bars and spaces is a function of the barcode pattern's order and size, as well as the distance and angle of the sensor to the barcode pattern. The sensor's output will vary in a ratiometric manner for a given barcode pattern. In other words, while the widths of all elements of the scanned barcode will increase as the sensor is moved closer to the barcode pattern, the width ratio of one element to another remains constant.

According to the present invention, a fuzzy barcode reader identifies a reference width in accordance with a predetermined barcode format and outputs ratio information in response to the supplied data pattern. In addition, the fuzzy barcode reader of the present invention can identify particular code sequences, such as Start and Stop sequences.

A particular feature of the present invention is that the scanned widths are supplied to a fuzzy membership function to determine the appropriate ratio relative to the reference width. As a result, the present invention provides accurate ratio determinations despite variations in the widths due to sensor or processing noise, or variations in the barcode pattern or angle of the sensor.

The present invention determines barcode ratios, also referred to herein as fuzzy ratio determination, by utilizing the "floating" fuzzy membership function of the fuzzy logic microcontroller disclosed in co-pending application 08/41;235. Specifically, the present invention identifies a reference width within the barcode sequence and defines a fuzzy membership function to have a center value equal to the reference width, and a width value for the membership function equal to a value proportional to the reference width. The fuzzy logic barcode reader of the present invention then latches sequentially each of the width values of the barcode sequence.

Each latched width value is divided by a set of all possible ratios. Each of the quotients corresponding to a given latched width value is then supplied as inputs to the fuzzy membership function to determine which quotient input is the correct ratio. The correct ratio for a corresponding width, once identified, is output for further processing, for example, either to a random-access memory, or a number processor.

The present invention also uses rule-based processing. Thus, the present invention can identify codes or Start/Stop sequences according to predetermined barcode formats, such as CODE 128 (USD-6), or AIM, USD-1 (Interleaved Two of Five).

The fuzzy ratio determination is preferably implemented in a fuzzy logic processor system that includes a fuzzy input processor, a fuzzy output processor and a fuzzy memory interface. Each of these elements of the fuzzy logic processor system are designed for maximum flexibility and may be used separately with other digital systems as cores for Application Specific Integrated Circuit (ASIC) designs. Since each of these elements are available as ASIC cores, the customization of fuzzy circuits becomes easier and more affordable. Thus, the fuzzy logic barcode reader of the present invention can be implemented at a relatively low cost.

The fuzzy input processor, also known as a fuzzy processor, directly receives input data and membership function parameter data, namely membership function center, width and type. The input data is supplied from a barcode interface that receives the analog data from the barcode sensor and converts it to digital width data. The digital width data is thereafter divided by a plurality of ratios. The fuzzy input processor successively determines a membership value for each quotient input data from the barcode interface. After fuzzification, the fuzzified input signals are processed in accordance with predetermined fuzzy logic rules for the predetermined barcode format in order to determine the optimum rule for execution. Once the optimum rule is identified, the fuzzy logic processor system executes the optimum rule.

The fuzzy input processor includes a Min/Max comparator for successively comparing the fuzzified input signals to each other in accordance with predetermined fuzzy logic rules established in accordance with control system output parameters. In other words, an output of the fuzzy logic processor system will be determined on the basis of its predetermined rules and the fuzzified input signals. Each output has a set of rules and each rule has a set of rule terms. Thus, the Min/Max comparator sequentially determines the fuzzy input signals which represent the minimum value term in the rule currently processed. The Min/Max comparator then successively compares each of the minimum value terms for each rule and identifies which rule provides the optimum output given the fuzzified inputs. The use of the Min/Max comparator provides minimum use of silicon on a semiconductor chip, resulting in a lower cost for the semiconductor chip.

The fuzzy logic processor system also includes a fuzzy output processor which outputs the desired output data in accordance with an output mode of the corresponding winning rule. Although the fuzzy ratio determination preferably uses an immediate output mode, the processor, the fuzzy output processor also provides Max-of-Min, Accumulate, and Weighted Average output modes. For example, in the Accumulate mode, the action value corresponding to the winning rule adds an offset to the existing output data, and outputs the resulting output signal to a device to be controlled. The Weighted Average mode, also known as a centroid mode, effectively offers a fuzzy output by modifying the output by the average of all actions of all corresponding rules where a membership function was considered valid. Thus, the output is a more accurate response to the input data.

The fuzzy logic processor system also includes a fuzzy memory interface capable of providing addressing control in accordance with the designer's specific application requirements. Specifically, the fuzzy memory interface controls the addressing and selection of data values from external memories or data sources to provide the necessary input data, fuzzy set parameter data or rule term data. As a result, a system designer can develop a customized system optimized for his application with minimal use of unnecessary components.

Thus, the present invention provides a fuzzy ratio determination technique implemented in a relatively simple and inexpensive fuzzy microcontroller which enables rapid processing of a plurality of inputs using fuzzy logic.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein:

FIG. 10 discloses a timing diagram of the fuzzy input processor of FIG. 7;

DETAILED DESCRIPTION OF THE PREFERRED EMBODIMENT

The preferred embodiment of the present invention will now be described with reference to the accompanying drawings.

Figure 3:
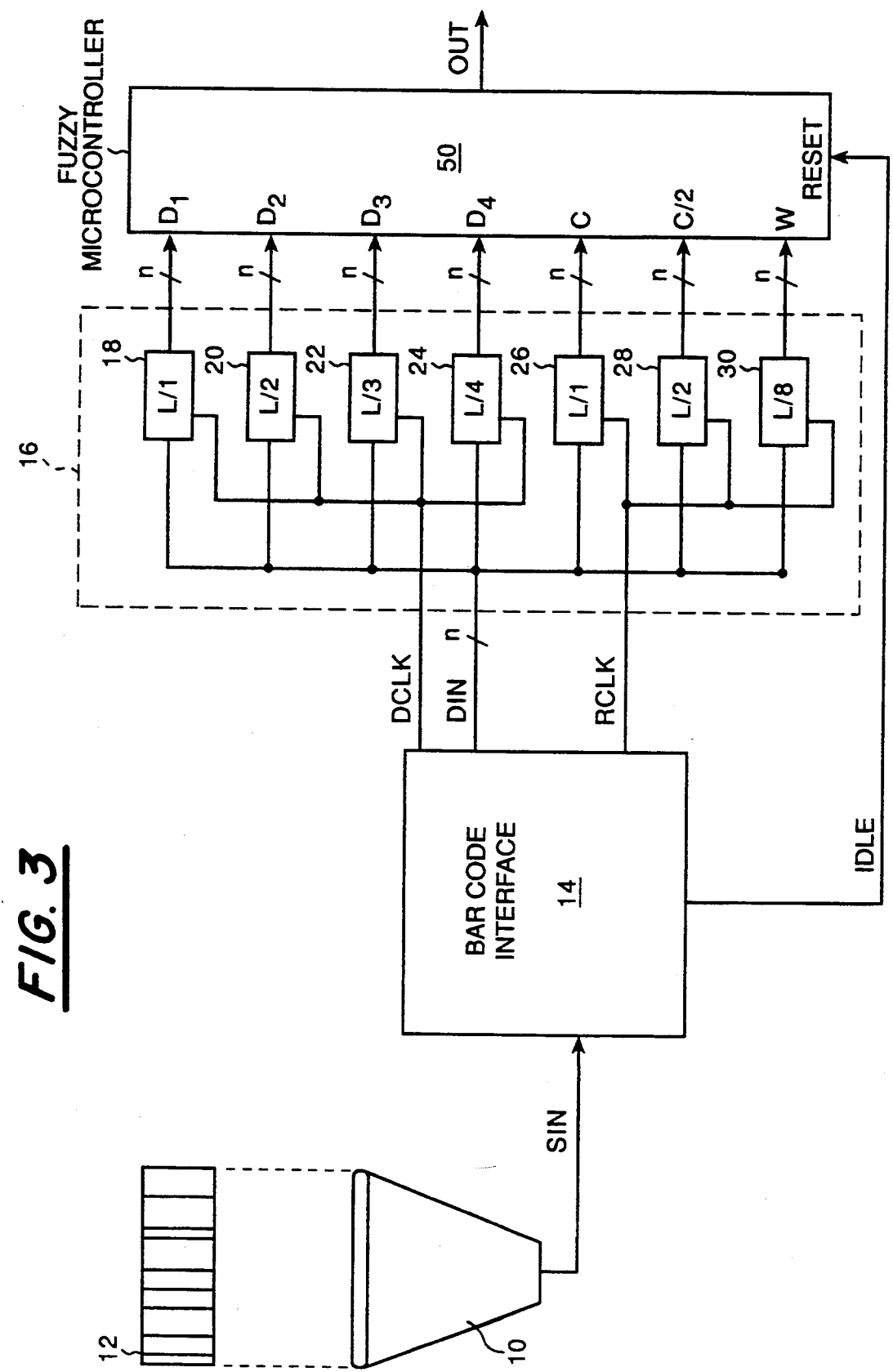
FIG. 3 discloses a block diagram of a fuzzy logic barcode reader according to a preferred embodiment of the present invention.

FIG. 3 is a block diagram of a fuzzy logic barcode reader according to a preferred embodiment of the present invention. The fuzzy logic barcode reader comprises a barcode scanner 10 that scans a barcode pattern 12. The barcode pattern 12 is composed of a plurality of alternately-arranged bars and spaces, also referred to generally as barcode elements. The scanner 10, typically either an optical scanner or a magnetic scanner, detects the presence of bars or spaces in the barcode pattern 12 and outputs an analog signal $S_{IN}$ in response to the detected bars or spaces; the analog signal $S_{IN}$ is preferably a pulsed signal having varying pulse widths corresponding to the width of the bars, and time intervals between adjacent pulses corresponding to the width of the spaces.

The barcode scanner signal $S_{IN}$ is supplied to a barcode interface 14 that determines the time interval of each sequential bar and space scanned by the scanner 10 and outputs the time interval as a digital width value to a latch array 16. The barcode interface 14 outputs an n-bit digital width value $D_{IN}$ that represents the width of a corresponding bar or space, and either a data clock signal $D_{CLK}$ or a reference clock signal $R_{CLK}$. The reference clock signal $R_{CLK}$ is output when the digital width value $D_{IN}$ represents a width of a reference bar or space, in accordance with the barcode format of the barcode pattern 12. The data clock signal $D_{CLK}$ is output when the digital width value $D_{IN}$ represents the width of any other bar or space detected by the scanner 10. If the barcode interface 14 determines that the scanner 10 is not reading data after a predetermined interval, the barcode interface 14 outputs an idle command signal IDLE to a fuzzy microcontroller 50 in order to suspend subsequent processing activity.

The latch array 16 latches the width data $D_{IN}$ into a series of latches that divide the latched data by a predetermined ratio. The latch array 16 thereafter outputs the divided-latched data as quotient data to the fuzzy microcontroller 50.

The purpose of the latch array 16 can be described as follows. The barcode scanner signal $S_{IN}$ output from the scanner 10 varies as a function of the size, orientation, and distance of the barcode pattern 12 relative to the scanner 10. For a given barcode pattern, the output of the barcode scanner 10 will vary in a ratiometric manner. In other words, although the widths of the bars and spaces increase as the scanner 10 moves closer to the barcode pattern 12, the width ratio of one barcode element to another barcode element remains the same. For example, if a first bar is twice as wide as a second bar, the scanner 10 located a predetermined distance from the barcode pattern 12 may measure the first bar as having a width of ten (10) units and the second bar having a width of twenty (20) units. As the scanner 10 is moved closer to the barcode pattern 12, the first and second bars may be measured as having widths fifteen (15) and thirty (30), respectively. Nevertheless, the ratios between the two bars (20/10=2, 30/15=2) remains the same, regardless of the distance between the scanner 10 and the barcode pattern 12.

Therefore, the present invention reads the information from the barcode scanner signal $S_{IN}$, determines the bar and space widths in response to the barcode scanner signal $S_{IN}$, and outputs the quotients of the width divided by predetermined ratios.

The accuracy and precision of the ratios of the widths is affected by many factors associated with the scanner 10 and the barcode pattern 12. For example, the actual widths of the bars and spaces in the barcode pattern may vary due to errors in printing the barcode pattern 12. Further, errors may arise if the angle or distance of the scanner 10 varies during the scanning process. Finally, errors associated with the scanner 10, such as sensor noise or processing errors, may affect the accuracy of the detected width relative to the ideal width of a barcode element.

Figure 2B:
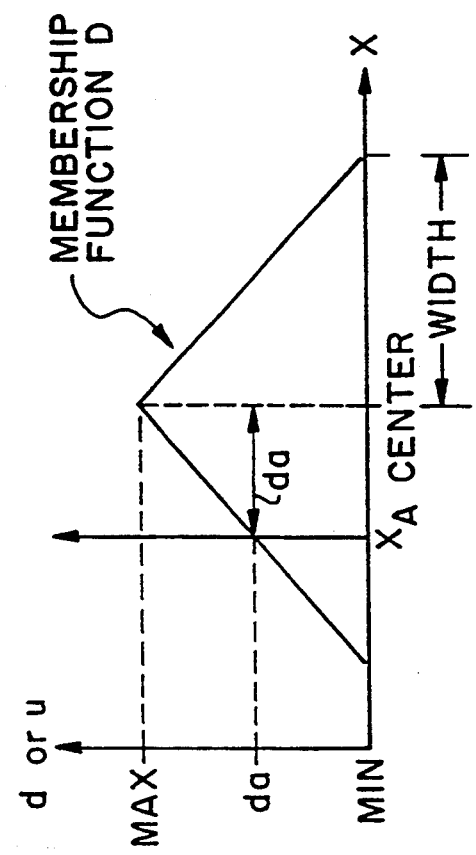
FIGS. 2A and 2B disclose fuzzy membership functions for determining the similarity of a crisp input to a fuzzy set.

The fuzzy logic barcode reader of the present invention uses fuzzy logic to determine ratios that fall within a predetermined error tolerance. Consequently, ratios can be accurately determined despite variations in the width data. According to the preferred embodiment, the width data $D_{IN}$ for an element is divided by all possible ratios under analysis. The resulting quotients are then compared to a fuzzy membership function having a structure as shown in FIG. 2B, whereby the center of the membership function is the width of the reference barcode element and the width of the membership function is a tolerance proportional to the width of the reference barcode element. The quotient that belongs to the membership function is deemed to represent the proper ratio. Thus, the present invention determines the proper ratio by comparing the width of each barcode element over all possible ratios to a membership function having its center set at the reference width.

The width of the fuzzy membership function determines the error tolerance of the fuzzy logic barcode reader. The preferred width of the fuzzy membership function is determined on the basis of the width of the reference barcode element. In determining the ratio tolerance, it is desired to maintain as wide a tolerance as possible. Further, it is desirable that the ratio tolerance increases as a function of the length of the reference width; preferably, the ratio tolerance is proportional to the reference width. For example, if a tolerance value is one (1) when a width value is ten (10), then similarly a tolerance value should be ten (10) when a width value is one hundred (100).

In determining the ratio tolerance, it is also desirable that tolerances do not cause overlapping results, otherwise it may be difficult to distinguish if a number belongs to one ratio or another. Finally, it is desirable that the maximum ratio error is limited to ±0.5 so that a ratio of "3.45" is not erroneously designated as a "4" instead of a "3".

In view of the above considerations, the inventors have determined that the ratio tolerance that determines the width of the membership function is optimized when set to equal the reference data length divided by two times the maximum ratio. In other words, the width W of the membership function should be directly proportional to the center C of the membership function, representing the reference width, according to the following equation:

$$W = C/(2*(\text{Max Ratio})) \quad (1)$$

Therefore, if a maximum ratio is "4" then the ratio tolerance, and consequently the membership function width, should be the reference width divided by eight (8), or $$W = C/8 \quad (2)$$

As shown in FIG. 3, the latch array 16 includes a plurality of latches that divide the digital width value $D_{IN}$ by a predetermined ratio. Latches 18 and 26 are 1:1 ratio latches, and are designated by the symbol "L/1". Latches 20 and 28 are 1:2 ratio latches designated by the symbol "L/2". Latches 22 and 24 are 1:3 and 1:4 latches designated by the symbol "L/3" and "L/4", respectively. Latch 30 is a 1:8 ratio latch designated by the symbol "L/8". The latches 26, 28, and 30 latch the data when the clock $R_{CLK}$ is active, indicating that the barcode interface 14 is outputting the width of a reference barcode element. The latches 18, 20, 22, and 24 latch the data when the clock $D_{CLK}$ is active, indicating that the barcode interface 14 is outputting the width of a barcode element that is not a reference element.

The latches of the latch array 16 output their respective quotient data to the fuzzy microcontroller 50 in order to determine the appropriate ratio of the digital width value $D_{IN}$ to the width of the reference barcode element. The fuzzy microcontroller 50 outputs at least one value OUT that preferably represents the determined ratio, a detected code from the barcode pattern 12, or a control signal for a device under control (not shown).

As discussed above, the fuzzy microcontroller 50 determines the ratio of the digital width value $D_{IN}$ with respect to the width of the reference barcode element by comparing the width of the digital width value $D_{IN}$ over all possible ratios to a membership function having its center set at the width of the reference barcode element. According to the preferred embodiment, one range of possible ratios includes 1:1, 1:2, 1:3, and 1:4. The inputs $D_1$, $D_2$, $D_3$, and $D_4$ to the fuzzy microcontroller 50 represent the digital width value $D_{IN}$ divided by the ratios 1:1, 1:2, 1:3, and 1:4, respectively. The inputs C and W represent the digital width value of the reference barcode element divided by the ratios 1:1 and 1:8, respectively.

As discussed in detail below with respect to the fuzzy microcontroller 50, each of the quotient inputs $D_1$, $D_2$, $D_3$, and $D_4$ are sequentially compared with the fuzzy membership function having a center from the input C and a width from the input W. The quotient input that falls within the fuzzy membership function will correspond to the correct ratio.

The input C/2 to the fuzzy microcontroller 50 enables ratios other than 1:X to be tested. For example, the ratio 2:3 can be implemented by substituting the input C/2 for the center of the fuzzy membership function. If the input $D_3$ (corresponding to the latch 22 designated "L/3") is found to belong to the membership function having a center at C/2, then the ratio of the data width to the reference width is 2:3.

Figure 4A:
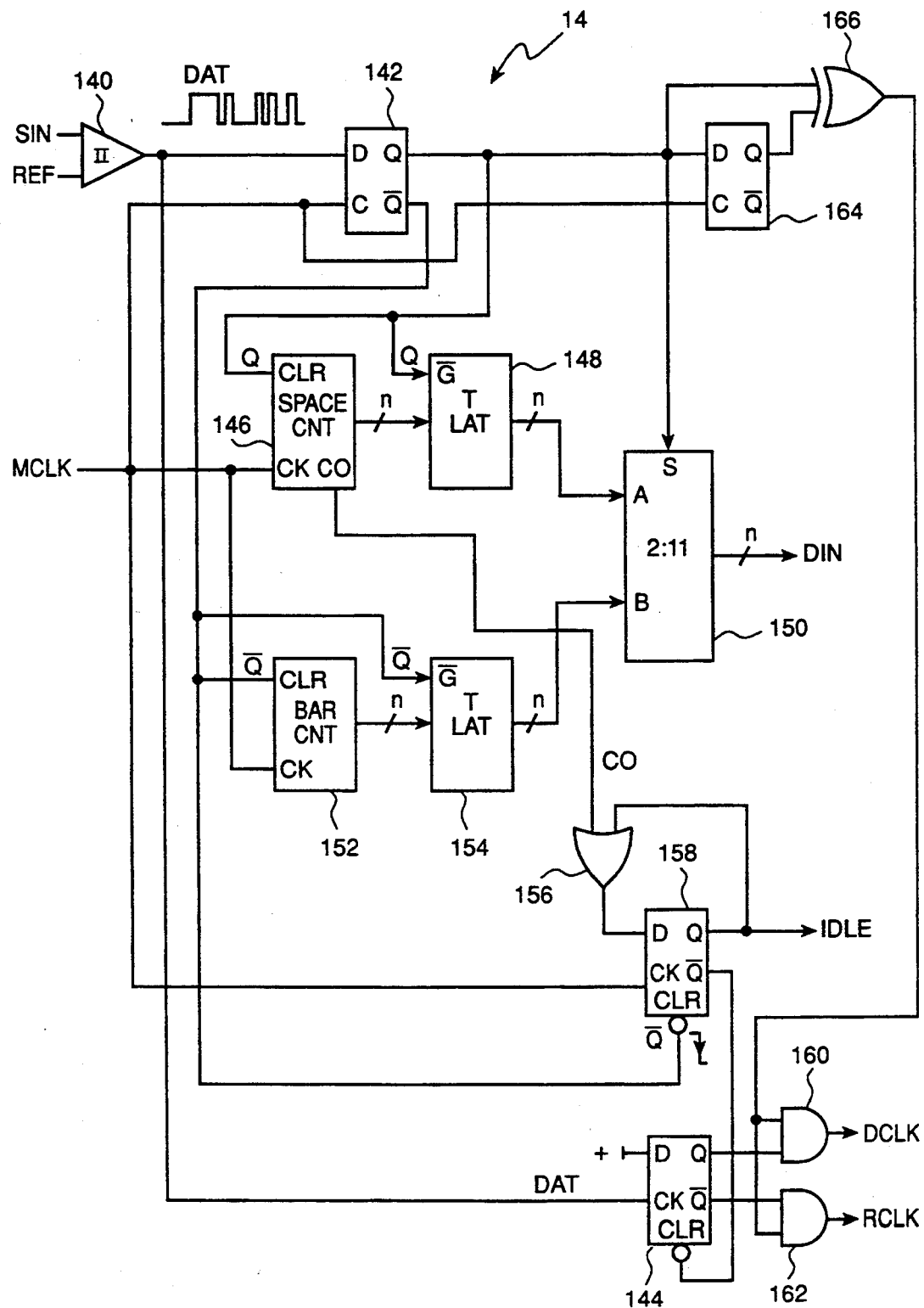
FIGS. 4A and 4B disclose a block diagram and a timing diagram for the barcode interface of FIG. 3, respectively.

FIG. 4A discloses a circuit diagram of the barcode interface 14 of FIG. 3. The barcode scanner signal $S_{IN}$ from the barcode scanner 10 is supplied to a comparator circuit 140 and compared with a reference voltage Ref to determine whether the scanner 10 has detected a bar or a space. The comparator circuit 140 outputs an analog signal DAT to delay flip flops 142 and 144. The delay flip flop 142 is clocked by a master clock signal MCLK that has a period substantially smaller than the smallest possible pulse width of the analog signal DAT.

The output Q of the flip flop 142 represents the presence of bar data when the output is high (Q=1). Similarly, the inverted output $\overline{Q}$ of the flip-flop 142 represents the presence of space data when the inverted output $\overline{Q}$ is high ($\overline{Q}$=1) or the output Q is low (Q=0). The output Q from the flip flop 142 is supplied to the clear (CLR) input of a space counter 146 and the inverted gate input $\overline{Q}$ of a latch 148. Since the output Q represents the presence of space data when the output is low (Q=0), the counter 146 increments and outputs a space width value to the latch 148 until the output Q goes high. Similarly, the latch 148 continues to latch data until the output Q goes high. When the output Q goes high, the counter 146 is cleared and the latch 148 holds the data previously output by the counter 146 and outputs the latched data to terminal "A" of a selector circuit 150. Thus, the data received by the selector circuit 150 from the latch 148 represents a digital value indicating the duration that the signal DAT was low. This duration of the signal DAT at a low level defines the width of a space.

The barcode interface 14 also includes a bar counter 152 and a latch 154 that determine the width of a bar in a manner similar to the counter 146 and the latch 148, respectively. The latch 154 outputs latched data to terminal "B" of the selector circuit 150 that defines the width of a bar. The selector circuit 150 outputs one of the n-bit digital inputs from terminals "A" and "B" as the element width data $D_{IN}$ in response to the Q signal from the flip flop 142 supplied to a select input (S) of the selector circuit 150.

According to the preferred embodiment, the barcode scanner signal $S_{IN}$ may have a "quiet period" or a "quiet zone", indicating that no data is being read by the barcode scanner 10. The barcode interface 14 has an IDLE signal that is activated when the space counter 146 outputs a counter overflow signal CO to an OR gate 156. The IDLE signal is output by a flip flop 158 until cleared (negative edge-triggered) by the inverted output $\overline{Q}$ of the flip flop 142, indicating that a bar from a new barcode pattern is being scanned.

According to the preferred embodiment, the flip flop 144 is used to identify the first bar as a reference element of the barcode pattern. Specifically, the AND gates 160 and 162 receive a low output and a high output from the flip flop 144, respectively, when the IDLE signal is high. A flip flop 164 causes an exclusive OR circuit 166 to output a high signal whenever there is a transition in the DAT signal. Since one clock cycle is needed for the delay flip flop 144 to latch and output the hardwired high value, the AND gate 162 outputs the signal for only the first clock cycle of MCLK that the signal DAT goes high after an idle period.

Figure 4B:
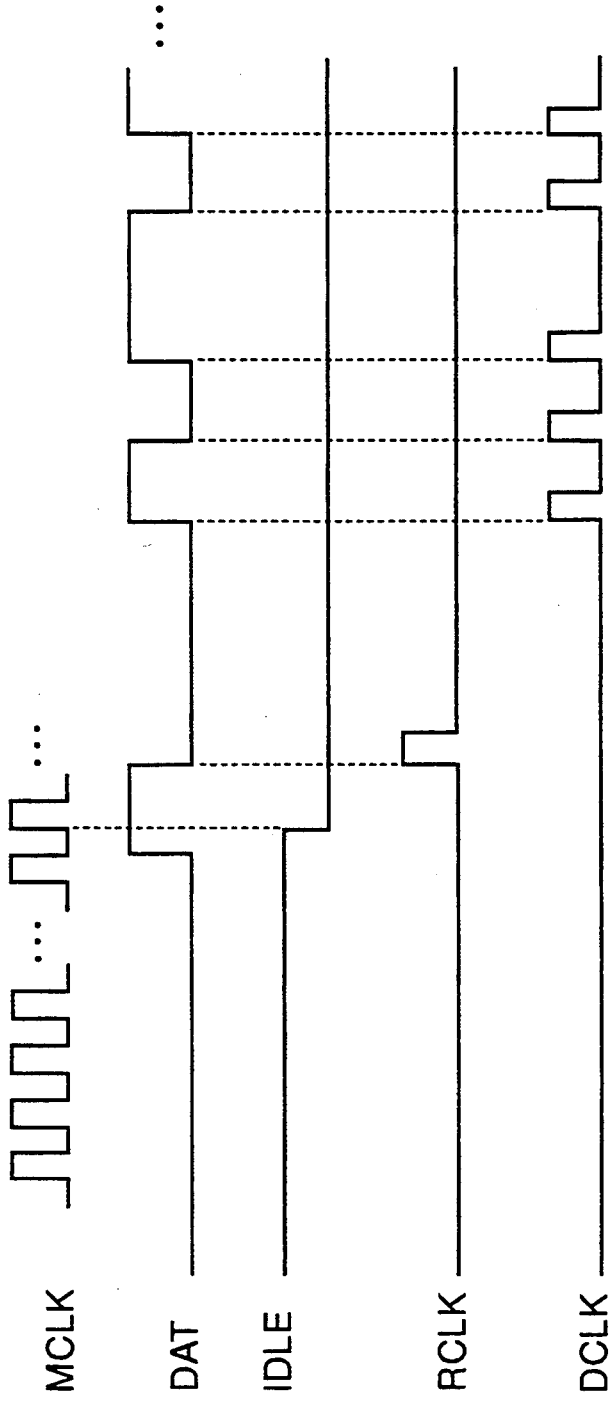

The timing sequence for the barcode interface 14 is shown in FIG. 4B. FIG. 4B shows that the reference data pulse $R_{CLK}$ is output after the IDLE signal goes low and the data signal DAT goes low. Thus, the first width data signal $D_{IN}$ is identified as a reference width so that the latch array 16 can properly latch the reference data. The pulse $D_{CLK}$ is thereafter output by the gate 160 whenever there is a transition in the DAT signal. Thus, the barcode interface 14 provides the appropriate signals to the latch array 16 to latch the sequential data (see FIG. 3).

It will be appreciated that the barcode interface 14 may be varied to identify a different barcode element as a reference element, depending on the format of the scanned barcode pattern.

Figure 5:
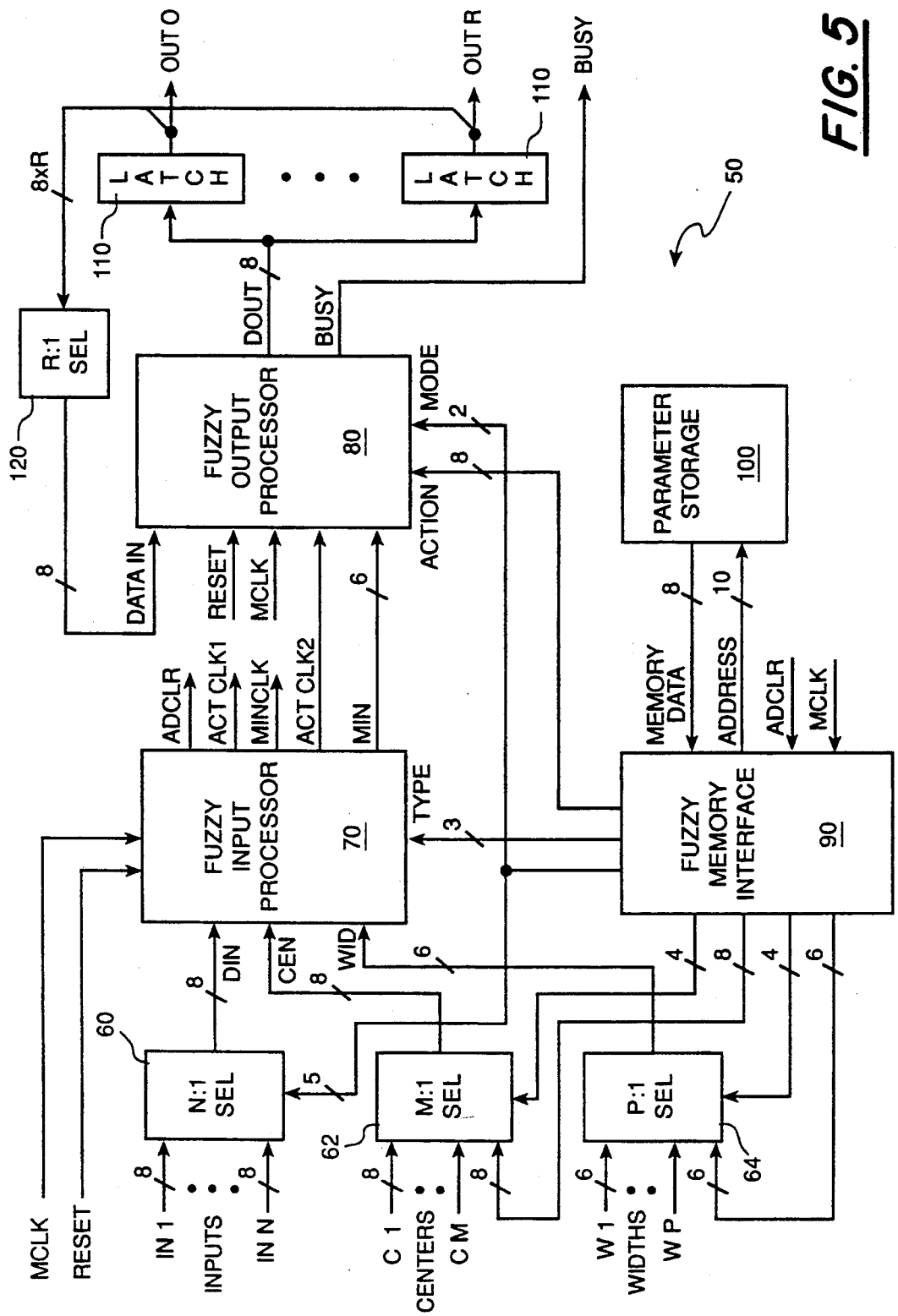
FIG. 5 discloses a block diagram of the fuzzy microcontroller of FIG. 3.

FIG. 5 discloses a block diagram of the fuzzy processor system 50 disclosed in FIG. 3. The fuzzy processor system 50 outputs an output signal DOUT representing the barcode ratios and/or the codes corresponding to the barcode ratios. The fuzzy processor system 50 may also control a plurality of devices by outputting an output signal DOUT to a corresponding controlled device (not shown in FIG. 5). The value of the output signal DOUT is determined by the rules associated with the output signal and the signals input to the fuzzy processor system 50. In other words, each output signal is the result of a predetermined set of rules which define the action to be taken by the output signal under certain input conditions. The fuzzy processor system 50 compares the input signals to each of the terms contained in the rules, one term and one rule at a time, to determine which rule will provide the optimum output.

As shown in FIG. 5, the fuzzy processor system 50 includes a set of selectors 60, 62 and 64, a fuzzy input processor 70, a fuzzy output processor 80, a fuzzy memory interface 90, a storage device 100 and a set of output latches 110.

Although not shown, it is assumed there is an external counter for controlling the output latches 110. One of ordinary skill in the art would be able to readily implement the counter, and any other necessary overhead logic in view of the following description.

The input selector 60 selects one of a plurality of inputs as data to be fuzzified in response to a 5-bit input select signal from the fuzzy memory interface 90. According to the preferred embodiment, the input selector 60 receives the inputs $D_1$, $D_2$, $D_3$, and $D_4$ from the latch array 16 (see FIG. 3). However, the inputs may also be from any external source such as a multiplexer (not shown) which time-multiplexes a plurality of sensor signals, for example. Although the input signal may be either analog or digital, the preferred embodiment uses an eight (8) bit digital word so that the input selector 60 receives a data stream of 8-bit digital input signals from each of the external sources. One of ordinary skill in the art will realize that the input selector 60 can accommodate analog TDM inputs by configuring the input selector 60 for TDM inputs and including an 8-bit A/D converter.

The center selector 62 and the width selector 64 select one of a plurality of inputs for center and width data in response to 4-bit center select and width select signals, respectively. The center select and width select signals, supplied by the fuzzy memory interface 90, enable a designer to create a variety of membership functions by combining the center and width parameter data from different sources, as opposed to copending application 07/893,093 and U.S. Pat. No. 5,245,695, which required specifically-defined membership functions and rules. Like the input selector 60, the inputs to the center selector 62 and the width selector 64 can be any digital inputs, such as a stored value, a digitized sensor signal or a clock signal. Therefore, the center or width of any membership function can be either a fixed or a dynamic value based upon time, temperature, force, distance, etc. As a result, the present invention enables the processing of dynamic membership functions. This feature is particularly effective in control systems having instability problems, and enables a self-adapting fuzzy logic system by defining the center and width of membership function on the basis of dynamic parameters.

As shown in FIG. 3, the preferred embodiment implements the fuzzy ratio determination by providing two inputs C and C/2 to the center selector 62 and a single width W to the width selector 64. However, FIG. 5 shows that the fuzzy memory interface 90 can also supply center and width data to the center selector 62 and the width selector 64, respectively. Thus, the fuzzy memory interface 90 enables the fuzzy input processor 70 to receive the fuzzy set parameter data from a variety of sources, including the external memory storage device 100, which may be implemented on the same integrated circuit or on a separate circuit.

The fuzzy input processor 70 receives the selected 8-bit input data (DIN), center data (CEN) and 6-bit width data (WID) from the corresponding selector. The fuzzy input processor also receives a 3-bit type command signal (TYPE) from the fuzzy memory interface 90 that indicates the type of membership function being used (described in detail below).

The selected input data signal (DIN) is fuzzified in accordance with the corresponding fuzzy set parameter data, namely center data (CEN), width data (WID) and the type command signal (TYPE).

The fuzzy input processor 70 sequentially processes the supplied data to determine the minimum rule term for each rule of a given output and the relative maximum for all the rules processed for the given output. In other words, a given output has a set of predetermined rules. These rules could, however, be shared across many outputs. Each rule has a set of rule terms that define the rules. As a result, the data inputs corresponding to a single rule are grouped together for successive processing.

The fuzzy input processor 70 successively processes the selected group of fuzzy inputs in accordance the rule being processed. The fuzzy input processor 70 determines whether the fuzzy logic rule has a likelihood of being executed on the basis of the fuzzified input signals. For example, a rule may be of the form "IF (Temp IS HOT) AND (Beta IS VERY_HUMID)

AND (Motor IS LOW) THEN INCREMENT Motor BY BIG_INCREASE". Each of the terms (e.g., "Temp IS HOT") of the rule is compared with the corresponding fuzzy input (e.g., "Temp") to determine whether there is a low or high correlation. The correlations of each of the rule terms are then compared to determine the minimum level of correlation amongst the rule terms. The minimum rule term (e.g., the rule term having the minimum level of correlation) represents the overall likelihood of the rule being executed on the basis of the fuzzified input signals. The fuzzy input processor 70 determines the minimum rule term for each rule sequentially, for example, one rule at a time. As described in detail below with respect to FIGS. 8A and 8B, the minimum rule term can be saved and applied to the subsequent rule being processed, thereby concatenating a plurality of rules to determine the minimum rule term.

The fuzzy input processor 70 outputs the minimum rule term as a 6-bit minimum term signal (MIN) and sets a strobe (MINCLK) that indicates new minimum data that is valid for data access. The fuzzy input processor 70 also compares the minimum rule term of the selected rule with the minimum rule terms of other corresponding rules and identifies the rule which has the maximum value for the minimum rule term. As described in detail below, the fuzzy input processor 70 outputs an action clock (ACT CLK1) when the minimum rule term under comparison (output as the current minimum term signal (MIN)) is greater than the previously stored minimum rule term, e.g., whenever a new winning rule has been determined. The fuzzy input processor 70 outputs a second action clock (ACT CLK2) at the end of the processing cycle of the last rule of a given output. As discussed in detail below, the last rule of a given input is identified by the type command signal (TYPE).

Therefore, the winning rule for a given output can be determined by monitoring the action clock (ACT CLK1), and can be used to latch an action address into an external register. The action clock (ACT CLK2) verifies the last occurrence of the action clock (ACT CLK1) as representing the optimum rule for the given output.

The fuzzy output processor 80 receives the 6-bit minimum rule term signal (MIN) and the second action clock (ACT CLK 2) from the fuzzy input processor 70. The fuzzy output processor also receives an 8-bit action value of a processed rule (ACTION) and a 2-bit defuzzifying mode signal (MODE) from the fuzzy memory interface 90. FIG. 5 shows that the fuzzy output processor 80 also receives a selected feedback signal (DATA IN) from a selector 120. As described in detail below, the fuzzy output processor 80 outputs a result (DOUT) for the winning rule to output latches 110 in accordance with one of the following selectable modes: Immediate, Accumulate and Weighted Average. The mode is selected in accordance with the defuzzifying mode signal (MODE).

The present invention implements the fuzzifying method disclosed in U.S. Pat. No. 5,245,695 to Basehore, incorporated herein by reference. Most sensors produce, and most actuators require, scalar values. Thus, the fuzzy processor system 50 of the present invention accepts crisp inputs and can provide crisp outputs. The term "crisp" refers to any input or output which yields a single, precise value.

Figure 1A:
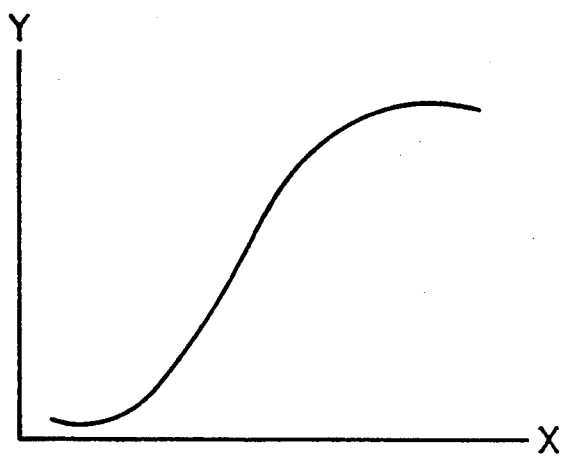
FIGS. 1A, 1B and 1C illustrate the logical distinctions between digital logic and fuzzy logic.
Figure 1B:
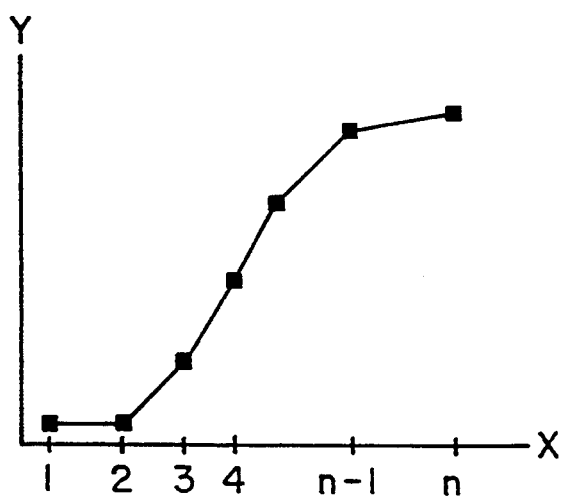
Figure 1C:
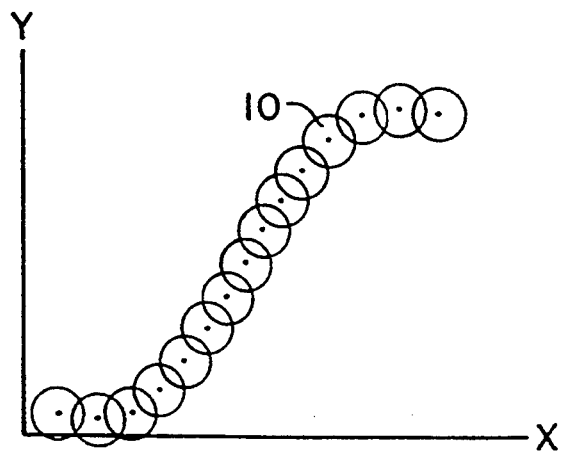
Figure 2A:
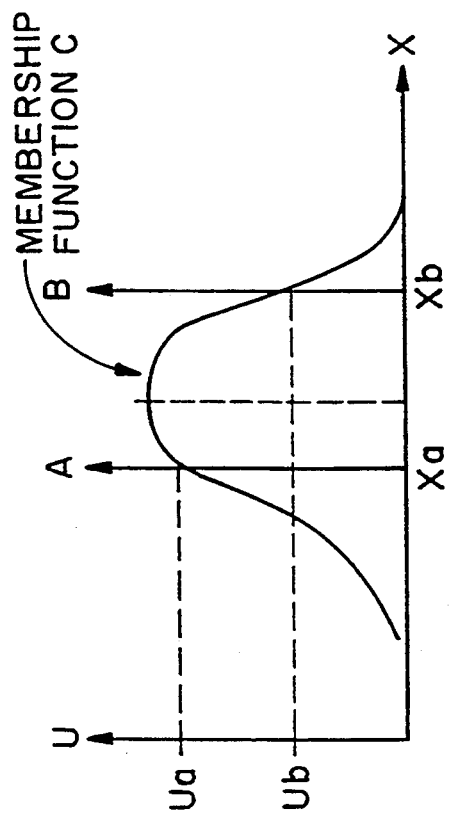

As shown in FIGS. 2A and 2B, each membership function specifies a relationship between the crisp input and the corresponding fuzzy set. In other words, the membership functions determine the size of the fuzzy sets 10 shown in FIG. 1C. The evaluation of the conjunction of the crisp input $X_a$ with a membership function results in a "fuzzy term": the term represents the degree of membership or non-membership of the crisp input $X_a$ in the corresponding fuzzy set. Since it is a fuzzy number, the term may be used in subsequent fuzzy rules, similar to Boolean operations.

Thus, the membership function in a fuzzy system defines the degree of similarity between an unknown input and a known value or class (for example, the fuzzy set). As shown in FIG. 2A, the degree of membership $\mu_a$ for a crisp input A having a value $X_a$ occurs at the point where the crisp input A intersects the membership function C. However, due to nonlinearities in the control system (for example, sensor characteristics, control responses, dynamic responses) the membership function $\mu$ may be nonlinear relative to the input dimension X, making the determination of the membership function shape, and hence the similarity determination, difficult to implement.

In order to avoid the determination of the membership function shape, the fuzzifying method of the present invention predefines the slope of the membership function, and determines the distance between the crisp input and the center of the membership function. As shown in FIG. 2B, the membership function D is defined to be linear with a predetermined slope (for example, the slope is one-to-one). Rather than determining the intersection point of the membership function and the crisp input $X_A$, the fuzzifying method measures the distance da by subtracting the crisp input from the known center value and ignoring the sign. The difference is then complemented with respect to the width of the membership function D so that if the input and the center are the same, then the similarity value da is a maximum, whereas if the input is further from the center, the similarity value approaches a minimum.

Figure 6A:
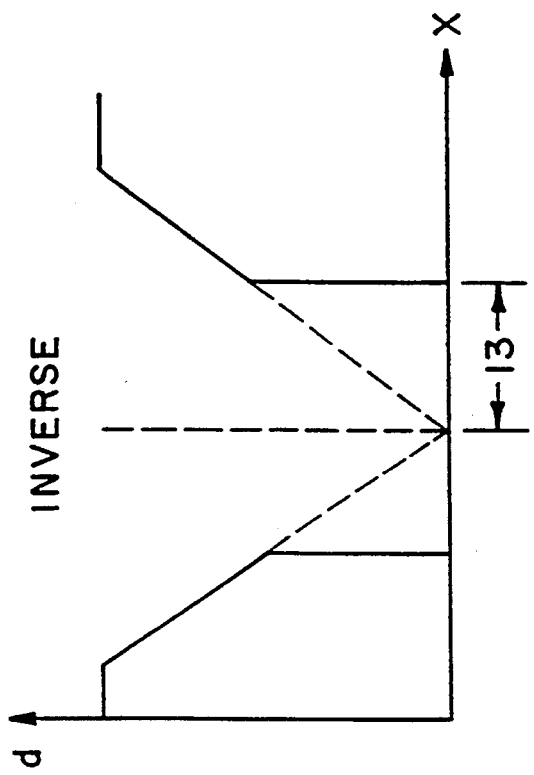
FIGS. 6A–6G illustrate exemplary relationships between a fuzzy set and a range of inputs on the basis of the membership function of the fuzzy set according to the fuzzifying method of the present invention.
Figure 6B:
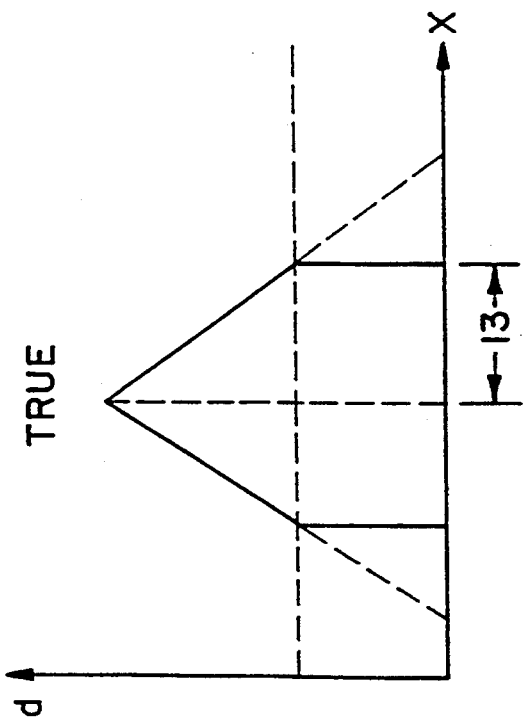

FIGS. 6A and 6B show a step membership function having true (inclusive) and inverse (exclusive) polarity, respectively. The dashed lines extending from the membership function illustrate the shape of the membership function if the width was set at a maximum. In other words, although the width of the membership functions in FIGS. 6A and 6B are set at a value of "13", the maximum width according to the preferred embodiment is "63". Therefore, if a crisp input X was outside the membership function of FIG. 6A, the similarity value would be forced to the minimum or zero.

Figure 6D:
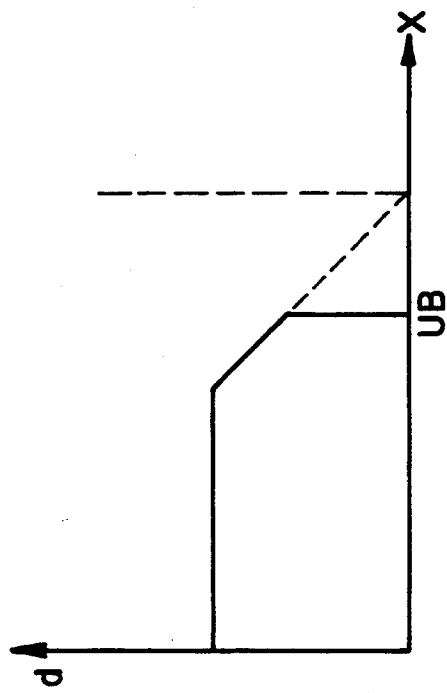
Figure 6C:
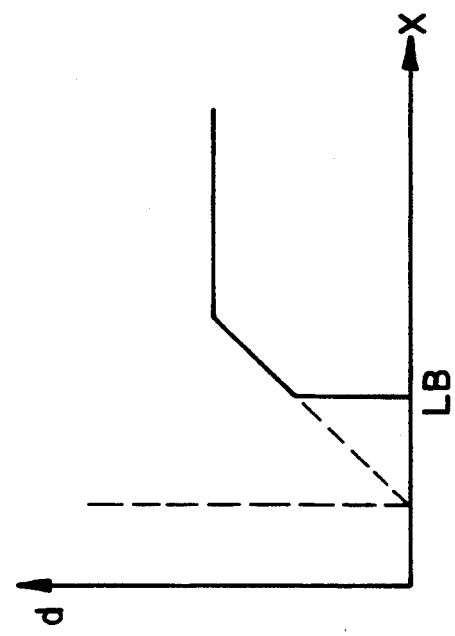

FIGS. 6C and 6D show membership functions for Greater Than and Less Than membership functions, respectively, each having inclusive polarity. In order for a crisp input to be a member of the Greater Than membership function, the distance between the crisp input and the center value must be greater than or equal to the lower boundary LB of the preset width value; conversely, in order for a crisp input to be a member of the Less Than membership function shown in FIG. 6D, the distance between the crisp input and the center value must be less than or equal to the upper boundary UB of the preset width value. It will be recognized using conventional Boolean operations as applied to fuzzy logic that a Greater Than membership function having inverse (exclusive) polarity will be equal to a Less Than membership function having a true (inclusive) polarity.

The advantages of the fuzzifying method of the present invention are that a designer of a control system is not required to determine a membership function shape for all fuzzy sets, and also that the fuzzifying method can be easily implemented in hardware. Further, the Less Than and Greater Than membership functions are asymmetrical membership functions. Consequently, utilization of both asymmetrical membership functions, via rule selection, provides the ability to define an adjustable height membership function.

Figure 6E:
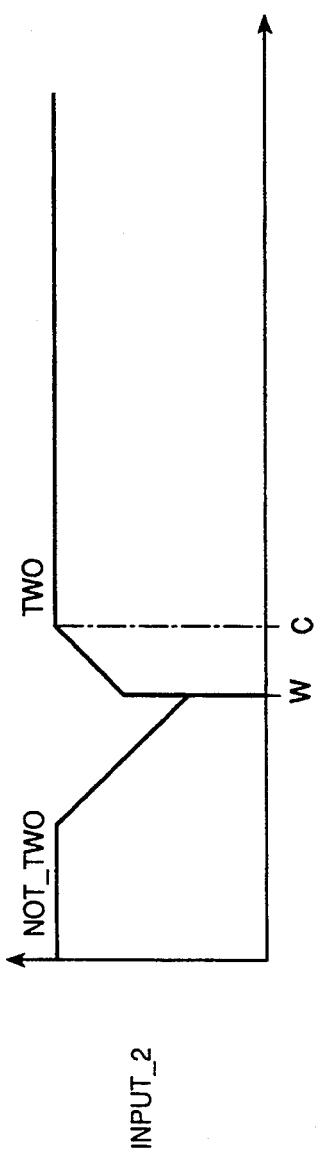
Figure 6F:
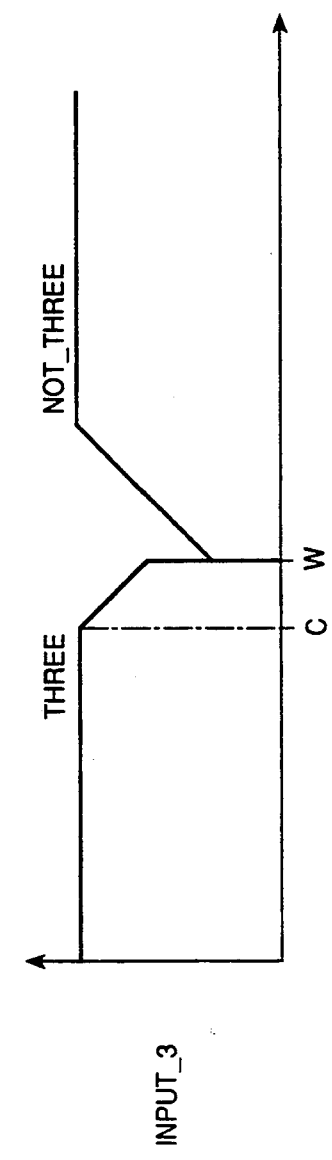
Figure 6G:
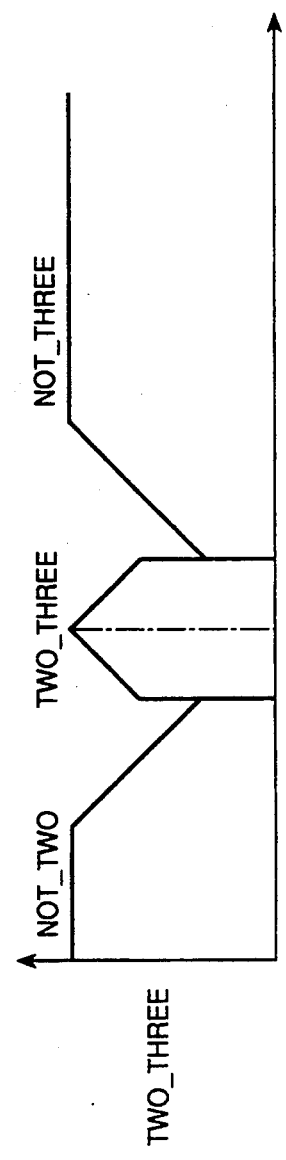

FIGS. 6E, 6F and 6G illustrate how rule selection can be used to create different membership functions for specific applications. For example, certain barcode formats recognize a 2-to-3 ratio, whereby the width ratio between an input width and a reference width is between 1:2 and 1:3. FIG. 6E discloses two membership functions, NOT_TWO and TWO, that determine whether an input quotient INPUT_2 is greater than or equal to the reference input, in accordance with the width tolerance. If the input quotient INPUT_2 belongs to the membership function TWO, then the ratio between the input width and the reference width is greater than or equal to the ratio 1:2. Similarly, the membership functions disclosed in FIG. 6F determine whether the ratio between the input width and the reference width is less than or equal to the ratio 1:3 by applying the input quotient INPUT_3 to the membership functions THREE and NOT_THREE.

The membership functions shown in FIGS. 6E and 6F can be combined to form the membership function in FIG. 6G according to the following rule: IF INPUT_2 IS TWO AND INPUT_3 IS THREE THEN TWO_THREE IS MIN (TWO, THREE). Thus, membership functions can be implemented by performing Boolean operations on existing membership functions.

Figure 7:
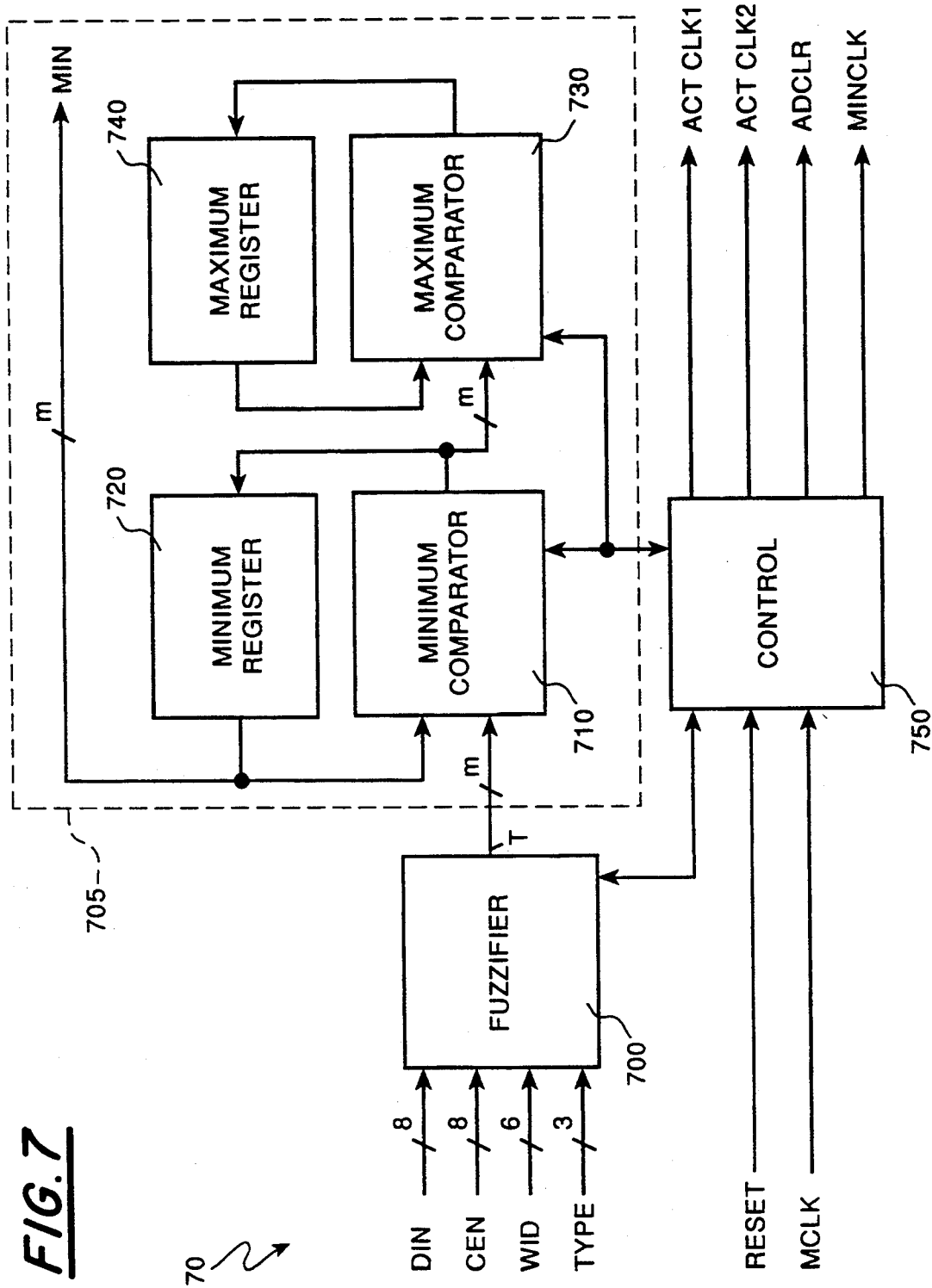
FIG. 7 discloses a block diagram of the fuzzy input processor of FIG. 5.

FIG. 7 shows a functional block diagram of the fuzzy input processor 70 of FIG. 5. The fuzzy input processor 70 includes a fuzzifier 700, a Min/Max circuit 705 and a control circuit 750. The Min/Max circuit 705 includes a minimum comparator 710, a minimum register 720, a maximum comparator 730 and a maximum register 740.

The fuzzifier 700 fuzzifies the 8-bit input data (DIN) in accordance with the supplied fuzzy set parameter data, namely the 8-bit center data (CEN), the 6-bit width data and the 3-bit type command signal (TYPE). The data is latched on the rising edge of the clock (MCLK). The type command signal (TYPE) identifies which of the membership functions of FIGS. 6A-6D are being processed. Alternately, the type command signal (TYPE) indicates the completion of processing of the rule terms for a given rule, or the completion of the last rule for a given output. Table 1 summarizes the 3-bit definitions for the type command signal (TYPE):

TABLE 1

| TYPE | DEFINITION |
|------|------------|
| 000 | Last Rule Processed |
| 001 | Last Term in the Current Rule |
| 010 | Symmetrical Inclusive |
| 011 | Symmetrical Exclusive |
| 100 | Right Inclusive |
| 101 | Right Exclusive |
| 110 | Left Inclusive |
| 111 | Left Exclusive |

Thus, the fuzzifier 700 outputs the fuzzified input as a rule term (T) to the minimum comparator 710 in accordance with the type of membership function selected.

The control circuit 750 outputs the strobe signals ACT CLK1, ACT CLK2, ADCLR and MINCLK in accordance with the operations of the fuzzifier 700 and the Max/Min comparator 705. The address clear (ADCLR) signal is used to set any external rule memory address counter and is set following the action clock (ACT CLK2) or whenever the RESET signal is received.

Figure 8A:
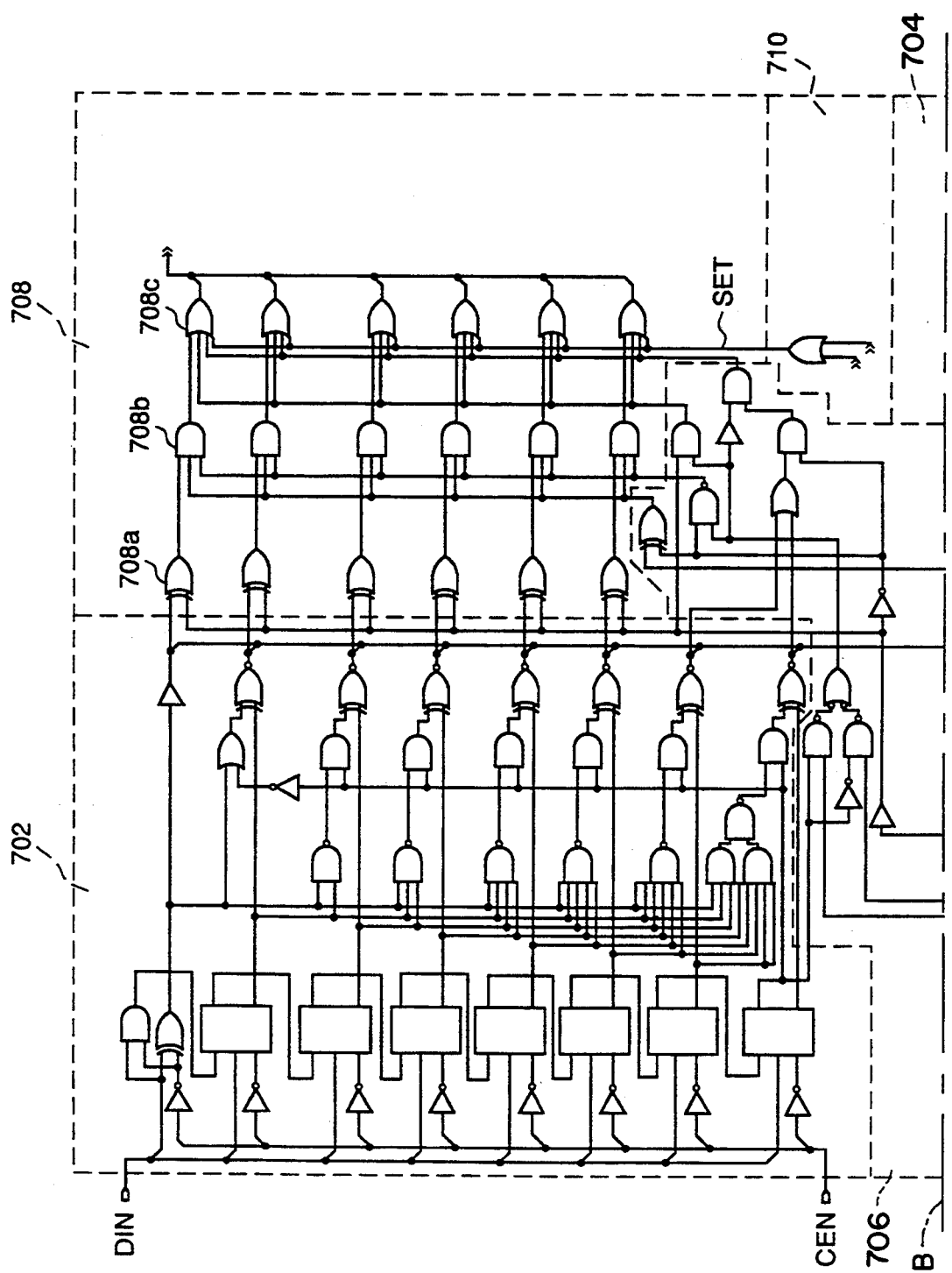
FIGS. 8A and 8B disclose a preferred schematic diagram of the distance measurement circuit of FIG. 7.
Figure 8B:
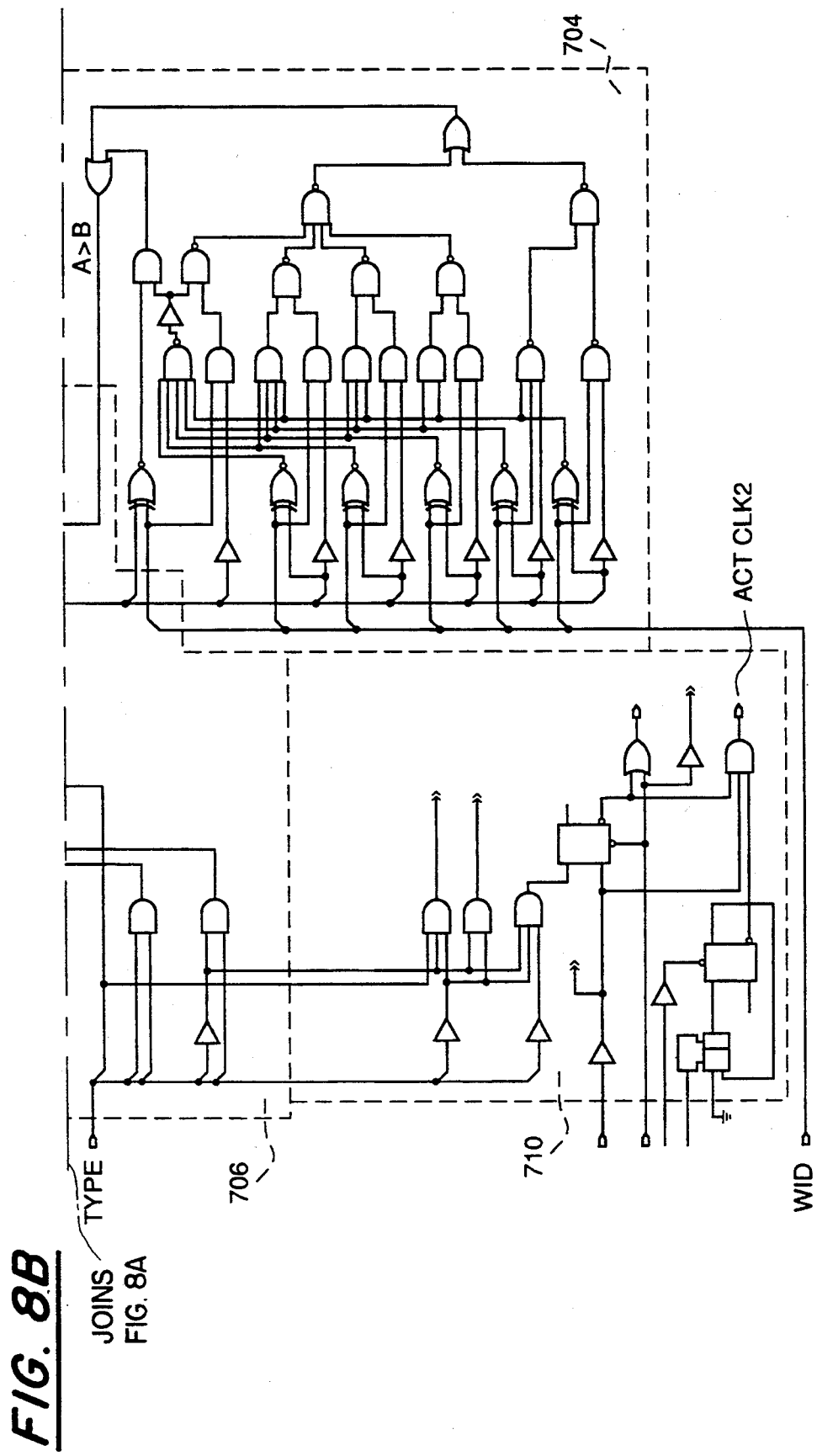

FIGS. 8A and 8B show the preferred schematic diagram of the fuzzifier 700 of FIG. 7. The fuzzifier 700 determines the similarity of a crisp input to a selected fuzzy set using the fuzzifying method disclosed with reference to FIGS. 6A-6D. The 8-bit input data (DIN) and center data (CEN) are supplied to a subtractor circuit 702. The subtractor circuit 702 outputs a difference signal (D) representing the distance between the crisp input and the center value. The difference signal (D) from the subtractor 702 is input to a width comparator 704 and compared with the membership function width value (WID). The width comparator 704 compares the difference signal (D) with the width value (WID) and outputs a comparison signal (A>B) to a control logic circuit 706.

The control logic circuit 706 determines whether the fuzzified value should be forced to a maximum value or a minimum value in accordance with the type command signal (TYPE), the comparison signal (A>B), and an overflow bit from the subtractor circuit 702. Thus, the control logic circuit 706 receives an overflow bit from the subtractor 702 to determine whether the distance exceeds the maximum possible width of the membership function. According to the preferred embodiment, the maximum width is sixty-three (decimal); thus, the overflow bit output from the subtractor 702 indicates whether the distance from the center to the crisp input exceeds the maximum width.

The control logic circuit 706 outputs control signals to an alpha cut calculator 708 in response to the result of the comparison from the comparator 704, and the configuration signals identifying the membership mode. The alpha cut calculator 708 outputs the fuzzified data from the difference of the subtractor 702 using the following logic: if the crisp data is outside the membership function (e.g., the result of comparison indicates the difference value is greater than the width of the membership function), then the fuzzified value is forced to zero if the polarity bit is not set (e.g., membership function is inclusive or "TRUE"); however, if the polarity bit is set, then the fuzzified value is forced to zero if the crisp data is "inside" the membership function.

In accordance with the fuzzifying method of the present invention, since the membership function has a one-to-one linear slope, the alpha cut calculator 708 takes the complement of the difference value and outputs the result as a similarity value, representing the degree of membership to the fuzzy set. The complement is determined as follows. According to the exemplary membership function presented in FIG. 6A, the maximum width of the membership function is "63" decimal, so that if a crisp input had, for example, a value "CI=7" and a selected membership function had a center location "CL=13" decimal and a width "W=9" then the difference "DIFF=13−7=6" would be complemented to result in a similarity value "COMP(DIFF)=ABS(6−63)=57" decimal. Thus, the similarity value is "57" with the maximum value being "63" if the difference DIFF was zero. As a result, the fuzzifying method of the present invention provides a simple and effective method for similarity determination between a crisp input and a fuzzy set.

The alpha cut calculator 708 includes an invertor circuit 708a, an AND circuit 708b, and an OR circuit 708c, each of which receive the control signals from the control logic circuit 706. The invertor circuit 708a performs a 1's complement inversion of the lowest six bits of the difference signal output from the subtractor 330 in accordance with the inclusive/exclusive bit from the type command signal (TYPE). The AND circuit 708b clears all the bits of the difference value when a "0" is received from the control logic circuit 706, and the OR circuit 708c sets all the bits of the difference value when a "1" is received from the control logic circuit 706.

The alpha cut calculator 708 also sets the term value (T) in response to the type decoder 710. The type decoder 710 outputs a set signal (SET) to the OR gate 708c whenever the type command signal indicates a last term (LT), a last rule (LR), or whenever the system reset signal (RESET) is activated.

Figure 9A:
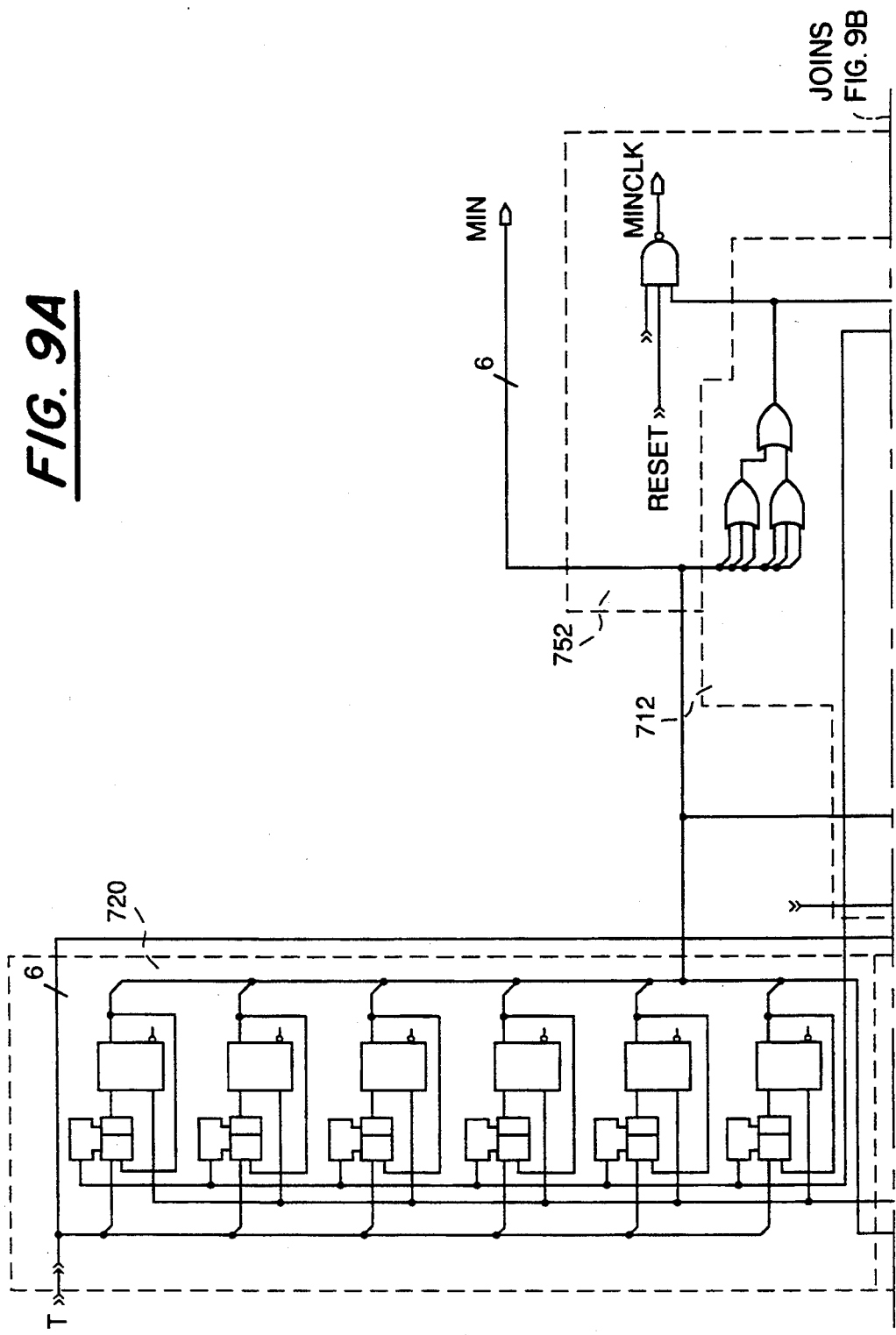
FIGS. 9 and 9B disclose the Max/Min comparator of FIG. 7.

FIGS. 9A and 9B disclose the Min/Max comparator 705 and a portion of the control circuit 750 of FIG. 7. Although FIG. 7 functionally shows the minimum comparator 710 and the maximum comparator 730 as separate elements for illustration purposes, the two comparator functions are performed by the same Min/Max comparator circuit 712 in order to minimize silicon area on an IC. Similarly, one of ordinary skill in the art will realize that the type decoder 710 and the control circuit portion 752 in combination make up the control circuit 750.

FIGS. 9A and 9B show that the fuzzified input term (T) from the fuzzifier 700 and the stored minimum value (MIN) from the minimum register 720 are supplied to the Min/Max comparator 712. The Min/Max comparator circuit 712 compares the fuzzified input term (T) and the stored minimum value (MIN) and outputs a result of comparison. Specifically, the NAND gate 714 outputs a result of comparison to the NOR gate 716 and the NAND gate 718. The NOR gate 716 and the NAND gate 718 output appropriate latch signals to the minimum register 720 and the maximum register 740, in accordance with the LT.LR control signal from the type command signal decoder 710. Thus, the NOR gate 716 outputs a minimum enable signal (MIN_ENA) only when the type command signal does not indicate the last term or last rule, when the reset signal is not set, or when the NAND gate 714 indicates that the term value (T) is less than the stored minimum value (MIN) (active low).

Conversely, the NAND gate 718 outputs a maximum enable signal (MAX_ENA) (active low) to the maximum register 740 when the NAND gate 714 outputs a signal indicating that the stored minimum value (MIN) is greater than the stored maximum value, and when the type command signal (TYPE) indicates the last rule is being processed.

The Min/Max comparator 712 includes a series of selectors 719 that select either the fuzzified input term (T) or the stored maximum value from the maximum register 740 in response to the LT.LR control signal from the type decoder 710. Thus, the type command signal (TYPE) controls whether the Min/Max comparator 712 operates in a minimum or maximum mode.

The control circuit portion 752 outputs the strobe MINCLK in response to the LT.LR control signal from the type decoder 710 shown in FIGS. 8A and 8B. The control circuit portion 752 also outputs the clock signal (ACT CLK1) in response to the maximum enable signal (MAX_ENA) from the NAND gate 718. As will be readily apparent to those of ordinary skill in the art, the strobe MINCLK becomes active on every last term or last rule providing that the result of all terms of that rule is greater than 0. The MINCLK signal is used by the fuzzy output processor in order to provide a weighted output average output (discussed in detail below).

The action clock (ACT CLK1) is generated on every last term or last rule provided that the minimum data is greater than or equal to the stored maximum data. Finally, the action clock (ACT CLK2) is generated on every last rule provided that the rule contained at least one action clock signal (ACT CLK1).

Thus, the action signal (ACT CLK1) can be used to identify the latest winning rule in order to restore the relevant action values related to that winning rule. Further, the action clock (ACT CLK2) can be used by external logic to latch the action data accessed during the occurrence of the action clock (ACT CLK1).

Finally, the address clear (ADCLR) is generated every last rule, and is utilized to clear the maximum register 740. The address clear (ADCLR) may also be used to clear external memories.

FIG. 10 is a timing diagram of the fuzzy input processor 70 shown in FIG. 7. FIG. 10 assumes that there is an external rule address counter for processing each rule of an output. As shown in FIG. 10, when the reset signal (RESET) is active (active low), the address clear (ADCLR) signal becomes active, clearing the rule address counter. The selected data is supplied to the fuzzy input processor 70 when the address clear (ADCLR) signal goes high. Data is clocked in during the rising edge of the master clock (MCLK). Exemplary data values are shown in parentheses as hexadecimal values. During each clock cycle, the fuzzified data is successively compared to the previous data to determine the minimum rule term, namely the crisp input having the farthest distance away from a membership function center. As shown in FIG. 10, the fourth data input (DATA IN) during processing of Rule 1 has a value of 62 hex. When compared with the center value of 78 hex, the hexadecimal difference is 16. When complementing the unsigned difference to six bits, the result is 29 hex.

The minimum value, 29 hex, is compared at the maximum comparator 730 and stored in the maximum register 740 if the value is larger than the previously stored value. Updating the maximum register causes an action clock (ACT CLK1) to be generated. The minimum clock (MINCLK) occurs when the type command signal (TYPE) has a value of 1, indicating the last rule term has been processed. This process continues for all the rules, until the last rule command is issued, in other words, when the type command signal (TYPE) has a value of 0. At that time, the fuzzy input processor 70 outputs the action clock (ACT CLK2) and the address clear (ADCLR), which starts a new cycle.

Figure 11:
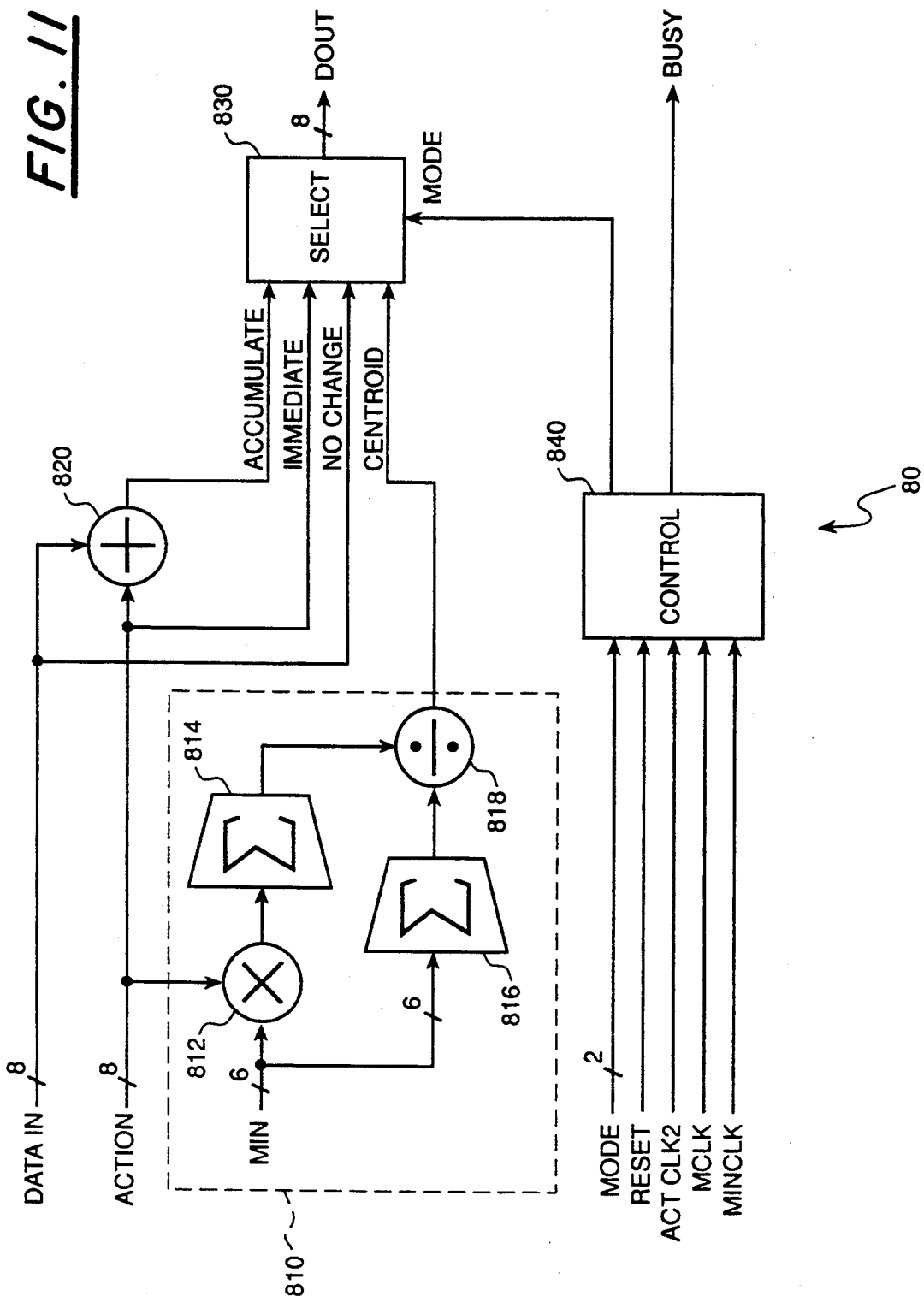
FIG. 11 discloses a block diagram of the fuzzy output processor of FIG. 5.

FIG. 11 discloses a block diagram of the fuzzy output processor 80 of FIG. 5. The fuzzy output processor 80 includes a centroid calculator 810 which calculates a centroid value, also known as a weighted average. The fuzzy output processor 80 also includes an adder 820 to provide an accumulate mode. Specifically, the action value corresponding to a winning rule is added to the previous output, which is supplied to the fuzzy output processor 80 via the DATA IN signal line (see FIG. 5). The signal paths DATA IN and the ACTION signal lines are also directly supplied to a select circuit 830, which selects one of the output modes as the output action value (DOUT) in accordance with a mode signal from a control circuit 840. The mode signal, supplied from the fuzzy memory interface 90 shown in FIG. 5, identifies the output mode for the corresponding winning rule.

As discussed in detail below with respect to FIG. 15, the preferred embodiment uses the immediate mode to output a number as representing the detected ratio for a scanned bar code element. Alternatively, an output value of either "0" or "1" is used as a flag for a plurality of outputs to identify the determined ratio.

The centroid calculator 810 includes a multiplier 812 which receives the 6-bit value signal (MIN) from the fuzzy input processor 70. The multiplier 812 also receives the 8-bit action value and supplies the multiplied result to a summation circuit 814. The minimum value signal (MIN) is also supplied to a summation circuit 816. The summation circuits 814 and 816 output their respective summation results to a dividing circuit 818, which provides the weighted average value, or centroid value, to the select circuit 830.

The Weighted Average mode causes the fuzzy output processor 80 to provide an averaged value of all the actions associated with the winning rules from the Min/Max comparator to be applied to the output action value (DOUT). Thus, the weighted average mode modifies the output by the average of the actions of all rules where a membership was considered valid. Specifically, the weighted average mode implemented by the centroid calculation circuit 810 follows the equation:

$$W = \frac{\sum_{i=1}^{n} m_i * a_i}{\sum_{i=1, m_i \neq 0}^{n} m_i}$$

where W is the average action value or centroid value output to the select circuit 830, n is the number of rules used by an output, $m_i$ is the minimum of terms value (MIN) for rule i, and $a_i$ is the action value (ACTION) assigned to the rule i. The rule mode processor 710 multiplies the minimum of terms value MIN with the corresponding action value ACTION and accumulates the weighted average W until the last rule for a corresponding output is processed, and divides by the accumulated minimum of terms value MIN.

Alternatively, normalization can be performed by dividing the accumulated value $m_i*a_i$ by the number of rules n multiplied by the value "63" which is the height of the membership function. The normalization can also be performed by dividing the accumulated value by "64" by performing a bit shift of the numerator. One will recognize that the resulting error will be negligible.

The number of rules n used by an output and the identity of a last rule for each output is determined by the action clock (ACT CLK2), whereby the control circuit 840 outputs the mode signal (MODE) to the selector circuit 830.

Figure 12:
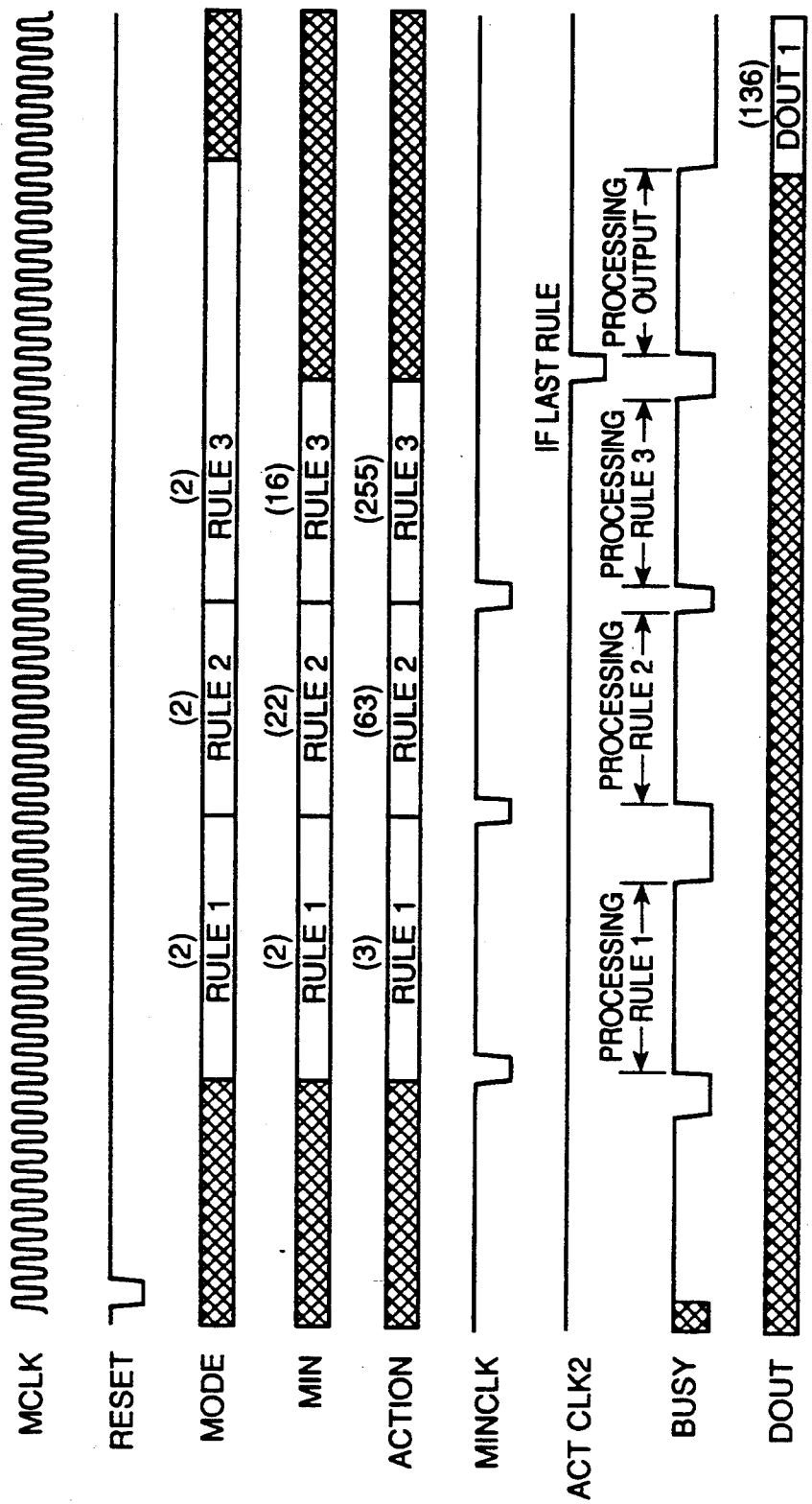
FIG. 12 discloses a timing diagram of the fuzzy output processor of FIG. 11.

The timing for the rule processing will now be described. FIG. 12 shows a timing diagram of the fuzzy output processor 80. The fuzzy output processor 80 processes a rule in response to the MINCLK strobe until the last rule used has been processed, indicated by the action clock (ACT CLK2) going active low. The control circuit 840 of the fuzzy output processor 80 outputs a BUSY signal to inform external circuitry that the fuzzy output processor 80 is busy processing a rule.

Although the outputs of the selector circuit 830 are digital, the output can be modified by adding a D/A converter to the selector circuit 830 or the latches 110 in FIG. 5, in order to provide an analog output signal. Further, the latches 110 in FIG. 3 can be arranged to provide TDM outputs.

Figures 13A, 13B:
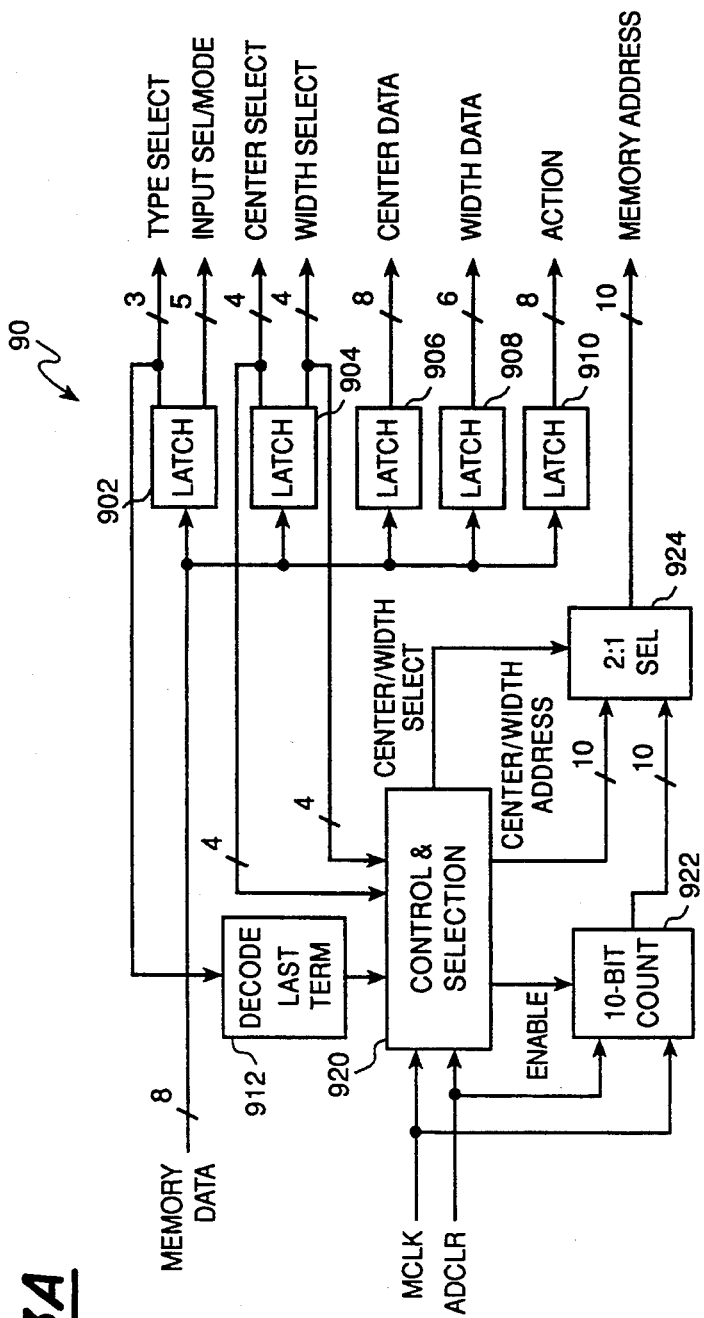
FIG. 13A discloses a block diagram of the fuzzy memory interface of FIG. 5.
FIG. 13B discloses an exemplary memory structure for rule terms processed according to the present invention.

FIG. 13A discloses a block diagram of the fuzzy memory interface 90 of FIG. 5. The fuzzy memory interface 90 receives an 8-bit memory data signal (MEMORY DATA), the master clock signal (MCLK), and the address clear signal (ADCLR) from the fuzzy input processor 70. The memory data signal (MEMORY DATA) represents the configuration data from an external byte wide memory for a rule to be processed. Thus, the memory data signal (MEMORY DATA) is a combination of term, rule and action data.

The byte wide memory 100, shown in FIG. 5, is organized in three sections. These sections are defined as rule/term storage, center storage, and width storage. The memory organization is illustrated in Table 2.

TABLE 2

| DECIMAL ADDRESS | HEX ADDRESS | FUNCTION |
|---|---|---|
| 0 to 991 | 000 to 3DF | Rules |
| 992 to 1007 | 3E0 to 3EF | Centers |
| 1008 to 1023 | 3F0 to 3FF | Widths |

As described previously, rules are organized as groups of one or more terms. FIG. 13B shows that each term is made up of two bytes. The first byte always is stored at an even address, and selects the input and type for the respective term. When the type is the last term, the input select field is used for selecting the defuzzification mode as well. The second byte, which is stored at an odd address, contains the center and width select fields. These fields point to the address having the desired center and width data. When the last type is last term, this byte then contains the action data value, or alternately could contain the address which points to the desired action data.

Therefore, it can be seen that the number of bytes required for any rule is

Bytes per rule=((2X)# of terms)+2.

The last 32 bytes of the addressed external memory are used to store the 16 widths and centers. When used, this data is output on the center and width data buses, and the 4-bit addresses for these parameters are output on the center and width select buses.

Thus, the appropriate address data is loaded into the fuzzy memory interface 90 via the memory data signal line (MEMORY DATA). Specifically, the latch 902 obtains the input select or mode data from the first byte of the rule memory portion of the parameter storage 100. The latch 902 also obtains the 3-bit type select data from the first byte and supplies it to a decoder 912. The latch 904 receives the center select and width select data from the second byte of the rule memory. The latches 906 and 908 receive center data and width data, respectively, addressed from the external memory. As shown in FIG. 5, the center data and width data are supplied to selectors 62 and 64, respectively. Similarly, the latch 910 receives the action data value from the second byte of the rule and outputs the action value to the fuzzy output processor 80.

Address generation for the external memory 100 is performed by the control and selection circuit 920, the 10-bit counter 922, and the 2:1 selector 924.

Figure 14:
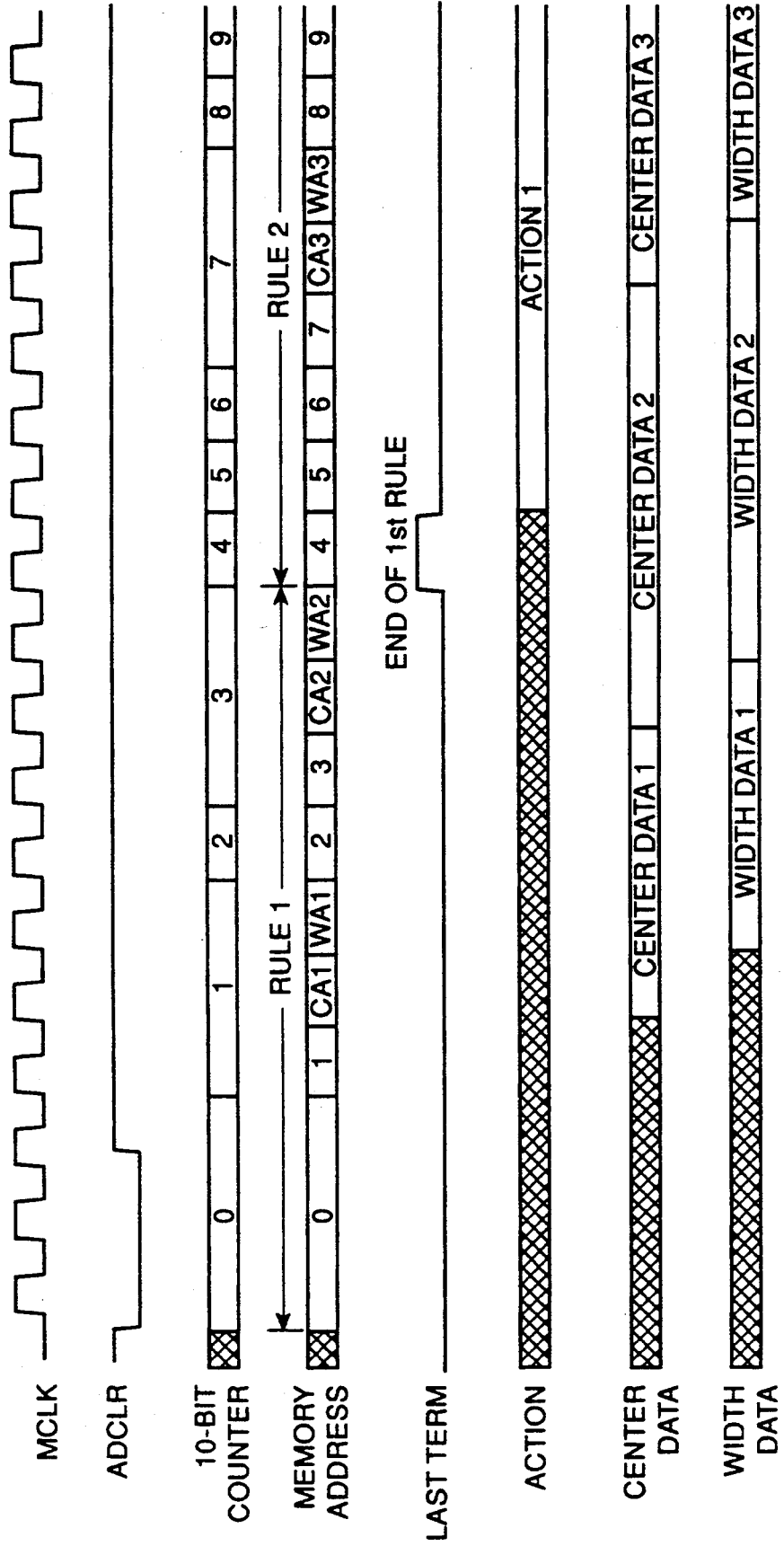
FIG. 14 discloses a timing diagram of the fuzzy memory interface of FIG. 13.

Operation of the fuzzy memory interface 90 will now be described with reference to FIGS. 13A and 14. The initialization is controlled by the address clear signal (ADCLR), whereby all transitions occur after the rising edge of the master clock (MCLK). The first clock causes the type command (TYPE) and input select data (INPUT SEL) to be read from the memory and latched by latch 902. The next clock latches the center and width select data to the latch 904. This address is used by the control selection circuit 920 to retrieve the actual center and width data during the next two clocks, which are thereafter stored in latches 906 and 908, respectively. The fourth clock cycle then repeats until a last term is decoded. This detection causes the action data to be latched in latch 910, and passed on to the fuzzy output processor 80. The first two addresses for the external memory originate from the 10-bit address counter 922 during the first two clocks. The address counter 922 is then disabled from counting for the next two clocks. The addresses during these clocks are created by the control and selection circuit 920 and the center select and width select information is stored in latch 904. When the address clear (ADCLR) signal is asserted, the control and selection circuit 920 resets the counters, and the entire cycle begins again from address 0.

One of ordinary skill in the art would realize that if it is not necessary to loop inputs or outputs back as centers or widths, the selectors 62 and 64 shown in FIG. 5 could be eliminated. In this case, the 8-bit center and 6-bit width data from the fuzzy memory interface 90 would be connected to the fuzzy input processor.

One of ordinary skill in the art would realize that the fuzzy memory interface 90 provides flexibility in the memory configuration of rule terms. However, the fuzzy memory interface could be replaced by other logic controlling the addressing of rule terms to the fuzzy input processor 70 and the fuzzy output processor 80.

The fuzzy microcontroller of the present invention provides efficient control using fuzzy logic, with high processing rates using minimum silicon space. The fuzzy microcontroller also provides an efficient method for compressing input and output data by time division multiplexing. Further, the fuzzy microcontroller provides a fuzzifying arrangement (apparatus and method) which is easy to implement by avoiding the necessity of determining a shape of a membership function. The availability of a floating fuzzifier, whereby a center is defined on the basis of a second input, enables more complex membership functions to be easily implemented. Further, the use of an adjustable width membership function enables a simple implementation of an adaptive fuzzy logic system.

The operation of the fuzzy microcontroller will now be described with respect to the preferred implementation, namely, a fuzzy ratio detection system for a fuzzy logic barcode reader.

Figure 15:
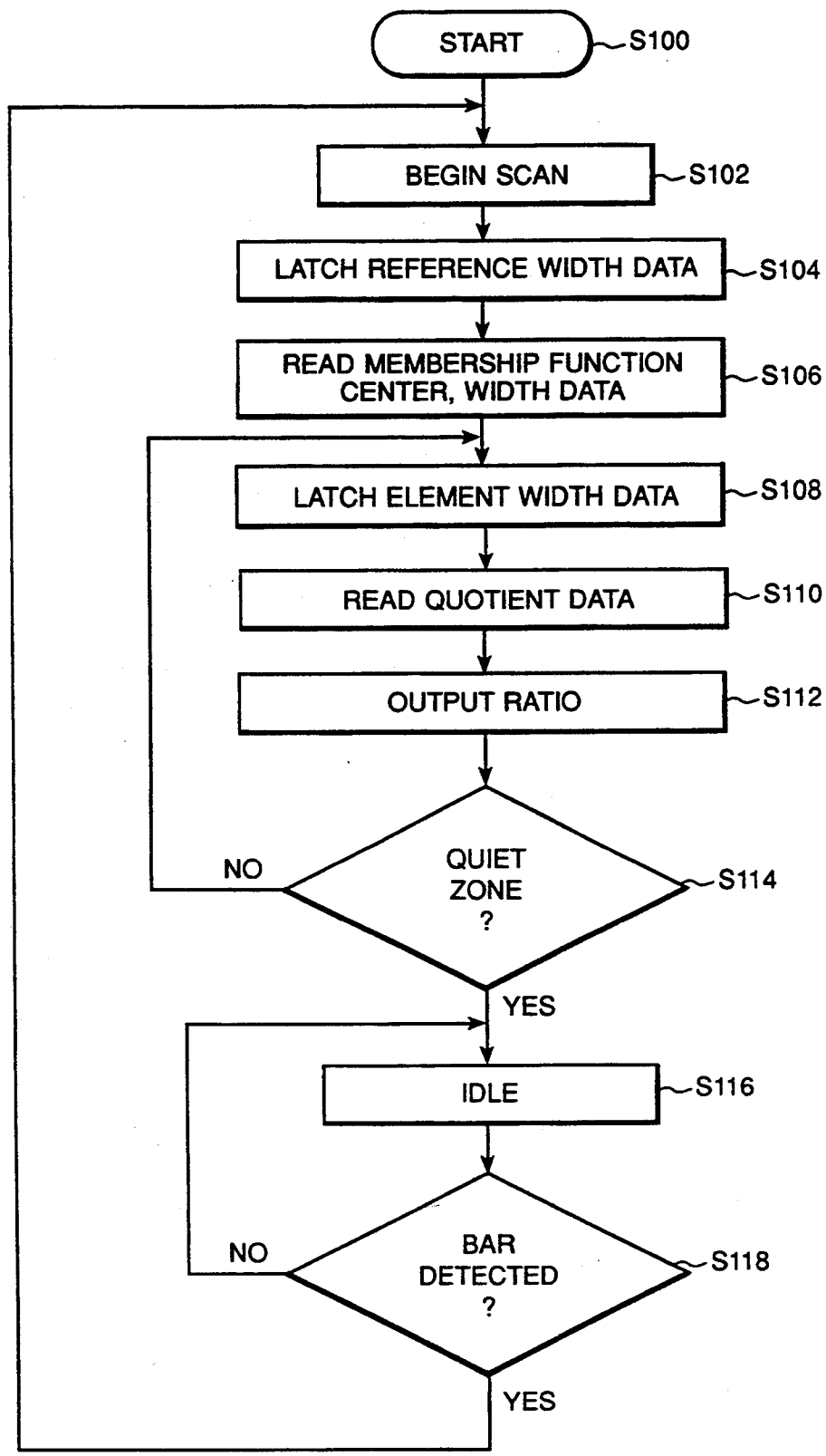
FIG. 15 discloses a flow diagram of the fuzzy logic barcode reader of FIG. 3.

FIG. 15 is a flow chart illustrating the operation of the fuzzy logic barcode reader disclosed in FIG. 3. The operation starts at step S100 by initializing the scanner 10, the bar code interface 14, and the fuzzy microcontroller 50. For example, the parameter storage 100 (see FIG. 5), also referred to as the byte wide memory 100, is loaded with all necessary rule data for the barcode formats to be processed. In addition, the parameter storage 100 may include rules to identify which barcode format is being scanned.

After the fuzzy logic barcode reader has been properly initialized, the barcode pattern 12 is scanned by the scanner 12 which outputs the barcode scanner signal $S_{IN}$ (step S102). According to the preferred embodiment, the barcode interface 14 assumes the first bar is the reference bar. Accordingly, the barcode interface 14 outputs the reference width data on the signal path $D_{IN}$ and the clock signal $R_{CLK}$ to the latches 26, 28 and 30, which latch the reference width data (step S104). The latch 28 and the latch 30 divide the reference width data by the ratios 1:2 and 1:8, respectively, by performing a bit-shift operation. The fuzzy microcontroller 50 then reads the membership function width data from the latch 30 and the membership function center data from either latch 26, which output the reference width, or latch 28, which outputs the reference width data divided by two (step S106).

After the membership function data has been read by the fuzzy microcontroller 50, the latches 18, 20, 22, and 24 latch the element width data $D_{IN}$ in response to the data clock signal $D_{CLK}$ (step S108), each of which divide the element width data $D_{IN}$ by the ratios 1:1, 1:2, 1:3, and 1:4, respectively. The fuzzy microcontroller 50 then sequentially reads the quotient data from the latches 18, 20, 22, and 24 into the data input terminals $D_1$, $D_2$, $D_3$, and $D_4$, respectively (step S110).

The fuzzy microcontroller 50 compares each quotient input supplied to the data input terminals $D_1$, $D_2$, $D_3$, and $D_4$ as a crisp input to a single membership function, for example as shown in FIG. 2B, that has its center and width defined with respect to the reference element width. Since only one of the quotient inputs will fall within the membership function, the one quotient input that falls within the membership function represents the correct ratio between the reference width data and the element width data. In other words, since a ratio equals the element width data divided by the reference width data, the reference width data is equal to the element width data divided by the ratio. The fuzzy microcontroller 50 recognizes the winning quotient input and outputs the determined ratio (step S112).

The fuzzy microcontroller 50 repeats the process for the next barcode element until an IDLE signal is received from the barcode interface 14 indicating the presence of a quiet zone (step S114). If the fuzzy microcontroller 50 receives an IDLE signal, the fuzzy microcontroller 50 remains in an idle state as long as the IDLE signal is present (step S116). As discussed above in detail with reference to FIG. 4A, the IDLE signal is terminated and the scanning operation is resumed when the barcode interface 14 detects a bar (S118).

It will be recognized that step S112 may be modified so that a flag signal corresponding to the winning ratio may also be output. For example, if there were four flag outputs for each ratio under analysis, OUT(1:1), OUT(1:2), OUT(1:3), and OUT(1:4), an exemplary rule for the output OUT(1:1) would follow the logic: "IF D1 IS MATCH THEN OUT(1:1) IS 1, OUT(1:2) IS 0, OUT(1:3) IS 0, OUT(1:4) IS 0.". In this instance, the membership function is named "MATCH" indicating that a match is found for the correct ratio when a crisp input (representing a specific ratio) is a member of the MATCH membership function.

Table 3 shows exemplary rules for outputting the winning ratio value as an output OUT after comparing the inputs D1, D2, D3, and D4 to the membership functions MATCH and NO_MATCH.

TABLE 3

| RULE NO. | TERMS |
|---|---|
| 1 | If D1 is MATCH then OUT is 1 |
| 2 | If D2 is MATCH then OUT is 2 |
| 3 | If D3 is MATCH then OUT is 3 |
| 4 | If D4 is MATCH then OUT is 4 |
| 5 | If D1 is NO_MATCH and D2 is NO_MATCH and D3 is NO_MATCH and D4 is NO_MATCH then OUT is 0 |

In another alternative to the above-described step S112, the fuzzy microcontroller 50 may perform rule processing to compare each of the quotient inputs to a plurality of membership functions as discussed above with respect to FIGS. 6E, 6F, and 6G.

As another alternative to the above-described step S112, rules can be concatenated so that a series of elements can be analyzed to determine a code or a Start/-Stop sequence. For example, the number of data inputs to the fuzzy microcontroller 50 can be increased to, for example, twenty-four (24) inputs, so that the fuzzy microcontroller 50 analyzes six barcode elements (B1, S1, B2, S2, B3, and S3) over four ratio values. As a result, rule processing can be applied as discussed above to perform code recognition. For example, the USD-6 (Code 128) barcode format defines the START(CODE A) code according to the bar-space sequence "211412" whereby the first bar has a width ratio of "2" and the first space is used as a reference element with a width of "1". A set of rules can be defined to output a predetermined code upon the recognition of the corresponding sequence of ratio values.

One of ordinary skill in the art will appreciate that the disclosed embodiment may be used for other barcode formats, including USD-3 (CODE 39 ®), and USD-1 (Interleaved Two of Five).

In accordance with the above-disclosed embodiment, one having ordinary skill in the art will appreciate that the fuzzy microcontroller 50 can use rule-based processing to control a plurality of devices in response to the detected ratios or the recognized codes. As shown in FIG. 5, the data outputs are fed back via the DATA IN signal path to the fuzzy output processor 80. Thus, the present invention can provide a complex rule-based processing system for controlling devices in accordance with the barcode outputs.

According to the present invention, the fuzzy logic barcode reader may be easily implemented in an IC chip by determining the distance between the crisp input and the center of the respective membership function as defined by the reference barcode element; if the distance is less than the width of the membership function (e.g., the ratio tolerance), then the distance value is complemented to determine the alpha cut, or the membership value of the crisp input with respect to that fuzzy set. Since the shape of the membership function for the fuzzy set need not be determined, the fuzzifying method of the present invention can be easily implemented, which results in substantial cost savings in design development and circuit implementation.

In addition, the fuzzy input processors of the present invention can be implemented in a cascaded arrangement, in order to provide greater processing capacity for a larger number of inputs, outputs, or both. Those skilled in the art will realize the technique of controlling a plurality of the fuzzy input processors in such a cascaded arrangement.

Those skilled in the art of fuzzy logic will also appreciate that the programmable rule base for an output can include, but be not limited to have any number of rules, any number of terms in a rule, the use of any or all logical functions as sentence connective operators, a permanent or volatile rule memory with on-chip or external rule storage.

Further, the rule base can have various configurations and include address pointers rather than data values to optimize rule memory storage capacity and flexibility.

Finally, those skilled in the art of fuzzy logic will appreciate that techniques for the determination of an optimum output, also known as "defuzzification" include but are not limited to defuzzification by the Mean of Maximum method, the Maximum method, the Center of Area or Center of Gravity methods, or equivalent methods thereof.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for determining a ratio of a barcode element relative to a reference barcode element in response to a barcode scanner signal representing a scanned barcode pattern, said scanned barcode pattern comprising said barcode element and said reference barcode element according to a predetermined format, the apparatus comprising:

means for identifying said reference barcode element from said barcode scanner signal in accordance with said predetermined format;

means for outputting membership function center and width data in accordance with said identified reference barcode element; and means for determining said ratio of said barcode element from a set of predetermined ratios, said determining means comprising:

means for dividing a width of said barcode element by each of said ratios and outputting a corresponding set of quotient data, means for comparing each of said quotient data to at least one membership function having a center and width defined by said membership function center and width data from said outputting means, respectively, said membership function having a predetermined linear slope, said comparing means comprising first means for determining a distance of said each quotient data from said center of said membership function and second means for linearly complementing each of said distances in accordance with said width of said membership function, said complemented distances indicating a membership value of said corresponding quotient data to said membership function, and means for selecting one of said ratios as said ratio of said barcode element in response to said membership values of said corresponding quotient data, said membership value corresponding to said one of said ratios having a maximum value relative to said membership values from said second means.

2. An apparatus as recited in claim 1, wherein said means for identifying comprises:
   means for outputting width data for each of said barcode elements and said reference barcode element of said scanned barcode pattern in response to said barcode scanner signal; and
   strobe means for outputting a first clock pulse when said means for outputting width data outputs width data of said identified reference barcode element and a second clock pulse when said means for outputting width data outputs said width of said barcode element.

3. An apparatus as recited in claim 2, wherein said dividing means comprises a plurality of latches corresponding to said predetermined ratios, each of said latches latching said width data from said identifying means in response to said second clock pulse and outputting one of said quotient data in accordance with said corresponding predetermined ratio.

4. An apparatus as recited in claim 2, wherein said membership function outputting means comprises at least a first and second latch that latch said width data of said identified reference barcode element in response to said first clock pulse, said first latch outputting said membership function center data, said second latch dividing said latched width data by a predetermined tolerance factor and outputting said membership function width data.

5. An apparatus as recited in claim 4, wherein said predetermined tolerance factor has a value of eight.

6. An apparatus as recited in claim 4, wherein:
   said membership function outputting means further comprises a third latch that latches said width data of said identified reference barcode element in response to said first clock pulse, divides said latched width data by a predetermined ratio factor, and outputs a second membership function center data;
   said comparing means further comprises means for selecting one of said membership function center data and said second membership function center data as said center of said membership function.

7. An apparatus as recited in claim 1, further comprising means for determining a code of said scanned barcode pattern in response to a sequence of said selected ratios output by said selecting means.

8. An apparatus for determining a ratio of sensor data relative to reference data from a set of predetermined ratios, the apparatus comprising:
   a latch array comprising:
      a plurality of first latches corresponding to said predetermined ratios and latching said sensor data in response to a data clock signal, each of said first latches dividing said sensor data by said corresponding predetermined ratio and outputting quotient data,
      a second latch for latching and outputting said reference data in response to a reference clock signal, and
      a third latch for latching said reference data in response to said reference clock signal, said third latch dividing said latched reference data by a predetermined tolerance factor and outputting said divided reference data; and
   means for determining said ratio of said sensor data, comprising:
      means for comparing each of said quotient data to a membership function having a center defined by said reference data output by said second latch and a width defined by said divided reference data, said membership function having a predetermined linear slope, said comparing means comprising a subtractor circuit that outputs a distance signal in response to said center and said each quotient data, and an alpha cut calculator circuit that linearly complements each of said distance signals corresponding to said each quotient data in accordance with said width of said membership function, said each complemented distance signals indicating a membership value of said corresponding quotient data to said membership function, and
      means for selecting one of said complemented distance signals having a highest membership value as corresponding to said determined ratio of said sensor data.

9. A method for determining a ratio of sensor data relative to reference data from a set of predetermined ratios, comprising the steps of:
   storing said sensor data in a latch array having a plurality of latches corresponding to said predetermined ratios;
   dividing said sensor data stored in each latch by said corresponding ratio and outputting the divided sensor data as quotient data to a controller circuit;
   dividing said reference data by a predetermined tolerance factor and outputting the divided reference data to said controller circuit;
   supplying said reference data to said controller circuit;
   storing a plurality of rules having rule terms in a memory, at least one of said rule terms corresponding to a membership function having a predetermined linear slope, a center defined by said supplied reference data and a width defined by said divided reference data;
   successively comparing each of said quotient data to said membership function in accordance with said stored rules in order to determine a corresponding membership value, comprising the steps of:
      successively supplying each of said quotient data and said reference data to a subtractor circuit within said controller circuit,
      outputting from said subtractor circuit a distance signal for each of said quotient data,
      supplying each of said distance signals to an alpha cut calculator circuit within said controller circuit, and
      outputting from said alpha cut calculator circuit a complemented distance signal corresponding to said each distance signals in accordance with said membership function, said complemented distance signal representing said corresponding membership value; and
   selecting a maximum of said membership values corresponding to said respective quotient data as said ratio of said sensor data.

* * * * *